(12) United States Patent
Mazzoccoli et al.

(10) Patent No.: US 12,274,997 B2
(45) Date of Patent: Apr. 15, 2025

(54) SORBENTS FOR IMMERSION COOLING

(71) Applicant: CALGON CARBON CORPORATION, Moon Township, PA (US)

(72) Inventors: Jason P. Mazzoccoli, Pittsburgh, PA (US); Steven L. Butterworth, Moon Township, PA (US)

(73) Assignee: CALGON CARBON CORPORATION, Moon Township, PA (US)

( * ) Notice: Subject to any disclaimer, the term of this patent is extended or adjusted under 35 U.S.C. 154(b) by 409 days.

(21) Appl. No.: 17/805,628

(22) Filed: Jun. 6, 2022

(65) Prior Publication Data

US 2022/0387968 A1    Dec. 8, 2022

Related U.S. Application Data

(60) Provisional application No. 63/196,892, filed on Jun. 4, 2021.

(51) Int. Cl.
| | | |
|---|---|---|
| *B01J 20/20* | (2006.01) | |
| *B01D 15/00* | (2006.01) | |
| *B01D 37/00* | (2006.01) | |

(52) U.S. Cl.
CPC .............. *B01J 20/20* (2013.01); *B01D 15/00* (2013.01); *B01D 37/00* (2013.01); *B01J 2220/485* (2013.01)

(58) Field of Classification Search
None
See application file for complete search history.

(56) References Cited

U.S. PATENT DOCUMENTS

| | | | |
|---|---|---|---|
| 4,978,650 | A | 12/1990 | Coughlin et al. |
| 6,000,198 | A | 12/1999 | Tramposch |
| 6,131,368 | A | 10/2000 | Tramposch et al. |
| 2004/0178149 | A1 | 9/2004 | Hernandez et al. |
| 2009/0201630 | A1 | 8/2009 | Yoshino et al. |
| 2014/0033512 | A1 | 2/2014 | Horn et al. |

(Continued)

FOREIGN PATENT DOCUMENTS

| | | |
|---|---|---|
| CN | 203425680 U | 2/2014 |
| CN | 109908650 A | 6/2019 |
| WO | 2022190013 A1 | 9/2022 |

OTHER PUBLICATIONS

Nevostrueva, "Enhancing the Metal Removal Capacity of Activated Carbon in Acidic Environments via Oxidation and Impregnation with Benzotriazole Derivatives", Thesis submitted to the Faculty of the Graduate School of the University of Colorado, pp. 111-139 (2009).

(Continued)

*Primary Examiner* — Chester T Barry
(74) *Attorney, Agent, or Firm* — DLA Piper LLP (US)

(57) ABSTRACT

Sorbent for filtering a coolant in immersion cooling systems, such as those used to cool electronic components. Sorbent may comprise activated carbon sorbent materials that have a bulk oxygen content of about 1 wt. % to about 5 wt. %, a moisture level of at most about 1.5 wt. %, and a molasses number of at least about 150. Sorbents may be contained within an enclosure to convey coolant therethrough to remove conductive contaminants from the coolant.

38 Claims, 6 Drawing Sheets

(56) References Cited

U.S. PATENT DOCUMENTS

2018/0125886 A1* 5/2018 Böhringer .......... B01J 20/28057
2020/0002589 A1 1/2020 Lamanna
2022/0017386 A1* 1/2022 DiStefano ............ B01J 20/3028
2023/0372920 A1* 11/2023 Richter ................. B01J 35/394

OTHER PUBLICATIONS

Valdes et al., "Effect of Ozone Treatment on Surface Properties of Activation Carbon", Langmuir, vol. 18, 2002, pp. 2111-2116.

* cited by examiner

SORBENTS FOR IMMERSION COOLING

CROSS REFERENCE TO RELATED APPLICATIONS

This application claims priority to U.S. Provisional Application No. 63/196,892, filed Jun. 4, 2021, which is hereby incorporated by reference in its entirety.

FIELD

The present disclosure relates generally to methods and systems for purifying coolants.

BACKGROUND

As client computing demands and datacenter density continue to increase, heat dissipation requirements of electronic components, such as microprocessors, chipsets, graphics processing units (GPUs), and memory modules are also rising. Conventional client computing devices and data centers are air cooled, frequently by way of heatsinks, cooling fins, and fans that move cool air to the electronic components and which remove waste heat by conduction and convection. Such devices and techniques have drawbacks. While air is electrically insulating and non-corrosive, its high volume for a given thermal capacity means that moving cool air to electronic components, removing heated exhaust, cooling the heated exhaust (frequently by air conditioning) and recirculating as cool air is mechanically energy intensive.

In contrast, immersion cooling envelops electronic components in a thermally conductive but electrically insulating (dielectric) coolant. Waste heat is thereby removed from the electronic components by the coolant by transferring the heat from the electronic components to the coolant. The now-heated coolant thereafter proceeds to a heat exchanger, where it is cooled by coming in proximity to another fluid, such as air or water. The coolants are electrically insulating to ensure that they can safely come into contact with leads, traces, surface mount pads, solders, and other electronic components that are exposed and energized during normal operation.

In general, an immersion cooling system comprises the electronic device to be cooled submerged in the coolant. Over time, various material components of the electronic device may leech out into the coolants. While the coolant itself is electrically insulating, metals from solder and metal electronic components as well as hydrocarbon oils found in elastomers, solder flux, resist materials, PVC insulation, foams, adhesives and reaction products thereof with the coolant introduce contaminants that may increase the conductivity of the coolant. Such contaminants that increase the electrical conductivity of fluids are referred to as conductive contaminants, and they are typically introduced into the coolant by leaching or otherwise diffusing from electronic components that are submerged in the coolant. Because an increase of conductivity is undesirable for a coolant that must remain electrically insulating, such conductive contaminants must be removed.

Presently, filtration systems exist for immersion cooling systems. However, such conventional filters and sorbents must be replaced frequently which is costly and can lead to unwanted maintenance and downtime. For example, a conventional sorbent which includes sorbent material is provided in an enclosure in an amount that is about five times the mass of anticipated contamination in the coolant. Optimization of the sorbent, particularly by increasing the efficiency and adsorbent capacity of the sorbent material contained therein, and the sorbent that is contained in a filter would represent an advancement in the industry that would reduce the cost associated with immersion cooling, both in reduced need for sorbent replacement, but also effecting improved efficiency using coolants with a higher purity. Such a sorbent should additionally not introduce contamination to the coolant itself.

SUMMARY

A summary of several embodiments in accordance with the disclosure appears below.

In some aspects, the techniques described herein relate to a method of purifying a coolant that contains one or more conductive contaminants, the method including: contacting the coolant with a sorbent to thereby cause the sorbent to adsorb the one or more conductive contaminants, wherein the sorbent includes a sorbent material that has a bulk oxygen content of about 1 wt. % to about 5 wt. %, a moisture level of at most about 1.5 wt. %, and a molasses number of at least about 150, wherein the sorbent material includes activated carbon.

In some aspects, the techniques described herein relate to a method, wherein the activated carbon is formed from one or more of bituminous coal, sub-bituminous coal, lignite coal, anthracite coal, wood, peat, nut shells, pits, coconut, babassu nut, macadamia nut, dende nut, peach pit, cherry pit, olive pit, walnut shell, wood, bagasse, rice hulls, corn husks, wheat hulls, polymers, resins, petroleum pitches, and other carbonaceous material.

In some aspects, the techniques described herein relate to a method, wherein the sorbent material is formed from calcination of a carbonaceous material under an inert atmosphere at a temperature of at least about 500° C.

In some aspects, the techniques described herein relate to a method, wherein the sorbent material has a gravimetric iodine number of at least about 850 mg/g.

In some aspects, the techniques described herein relate to a method, wherein the sorbent material has a gravimetric iodine number of at least about 1100 mg/g.

In some aspects, the techniques described herein relate to a method, wherein the sorbent has been treated to prevent reintroduction of oxygen.

In some aspects, the techniques described herein relate to a method, wherein treating the sorbent to prevent the reintroduction of oxygen includes one or more of purging the sorbent material with an inert atmosphere, placing the sorbent within an enclosure with an oxygen scavenging compound, and mechanically removing oxygen from an enclosure that contains the sorbent.

In some aspects, the techniques described herein relate to a method, wherein the coolant includes one or more of an oil, a hydrocarbon, a ketone, an ether, or any fluorinated derivative thereof In some aspects, the techniques described herein relate to a method, wherein the coolant has a boiling point of about 34° C. to about 175° C. and a dielectric constant of less than about 10 at 1 kHz.

In some aspects, the techniques described herein relate to a method, wherein the coolant has a kinematic viscosity of not more than about 0.8 cSt.

In some aspects, the techniques described herein relate to a method, further including contacting an electronic component with the coolant and diffusing conductive contaminants from the electronic component to the coolant.

In some aspects, the techniques described herein relate to a method, further including filtering the coolant through a size exclusion filter.

In some aspects, the techniques described herein relate to a system for purifying a coolant that contains one or more conductive contaminants, the system including: an enclosure containing a sorbent that includes a sorbent material that has a bulk oxygen content of about 1 wt. % to about 5 wt. %, a moisture level of at most about 1.5 wt. %, and a molasses number of at least about 150, at least one inlet, or at least one outlet, or at least one inlet and at least one outlet that is in communication with the sorbent and a tank containing the coolant such that at least a portion of the coolant contacts the sorbent.

In some aspects, the techniques described herein relate to a system, wherein the sorbent includes sorbent material that is activated carbon.

In some aspects, the techniques described herein relate to a system, wherein the activated carbon is formed from one or more of bituminous coal, sub-bituminous coal, lignite coal, anthracite coal, wood, peat, nut shells, pits, coconut, babassu nut, macadamia nut, dende nut, peach pit, cherry pit, olive pit, walnut shell, wood, bagasse, rice hulls, corn husks, wheat hulls, polymers, resins, petroleum pitches, and other carbonaceous material.

In some aspects, the techniques described herein relate to a system, wherein the sorbent material is formed from calcination of a carbonaceous material under an intert atmosphere at a temperature of at least about 500° C.

In some aspects, the techniques described herein relate to a system, wherein the sorbent material has a gravimetric iodine number of at least about 850 mg/g.

In some aspects, the techniques described herein relate to a system, wherein the sorbent material has a gravimetric iodine number of at least about 1100 mg/g.

In some aspects, the techniques described herein relate to a system, wherein the sorbent has been purged with nitrogen to prevent reintroduction of oxygen.

In some aspects, the techniques described herein relate to a system, wherein the sorbent is inertly-packed or vacuum packed in the enclosure.

In some aspects, the techniques described herein relate to a system, further including a pump that conveys the coolant through the sorbent.

In some aspects, the techniques described herein relate to a system, wherein the coolant includes one or more of an oil, a hydrocarbon, a ketone, an ether, or any fluorinated derivative thereof.

In some aspects, the techniques described herein relate to a system, wherein the coolant has a boiling point of about 34° C. to about 175° C., a freezing point of about −38° C. to about −138° C., and a dielectric constant of less than about 10 at 1 kHz.

In some aspects, the techniques described herein relate to a system, wherein the coolant has a kinematic viscosity of not more than about 0.8 cSt.

In some aspects, the techniques described herein relate to a system, further including an electronic component that contains one or more conductive contaminants.

In some aspects, the techniques described herein relate to a system, wherein the electronic component is housed within a data center.

In some aspects, the techniques described herein relate to a system, further including a size-exclusion filter connected downstream of the enclosure including the sorbent.

In some aspects, the techniques described herein relate to a composition for purifying a coolant that contains one or more conductive contaminants, the composition including: a sorbent that includes a sorbent material that has a bulk oxygen content of about 1 wt. % to about 5 wt. %, a moisture level of at most about 1.5 wt. %, and a molasses number of at least about 150, wherein the sorbent material includes activated carbon.

In some aspects, the techniques described herein relate to a composition, wherein the activated carbon is formed from one or more of bituminous coal, sub-bituminous coal, lignite coal, anthracite coal, wood, peat, nut shells, pits, coconut, babassu nut, macadamia nut, dende nut, peach pit, cherry pit, olive pit, walnut shell, wood, bagasse, rice hulls, corn husks, wheat hulls, polymers, resins, petroleum pitches, and other carbonaceous material.

In some aspects, the techniques described herein relate to a composition, wherein the sorbent material has a contact pH of about 6.5 to about 12.

In some aspects, the techniques described herein relate to a composition, wherein the sorbent material has a gravimetric iodine number of at least about 850 mg/g.

In some aspects, the techniques described herein relate to a composition, wherein the sorbent material has a gravimetric iodine number of at least about 1100 mg/g.

In some aspects, the techniques described herein relate to a composition, wherein the sorbent has been treated to prevent reintroduction of oxygen.

In some aspects, the techniques described herein relate to a method for making a sorbent for purifying a coolant that contains one or more conductive contaminants, the sorbent containing a sorbent material, the method including: calcining a precursor sorbent material to thereby form a sorbent material that has a bulk oxygen content of about 1 wt. % to about 5 wt. %, a moisture level of at most about 1.5 wt. %, and a molasses number of at least about 150, wherein the sorbent material includes activated carbon.

In some aspects, the techniques described herein relate to a method, where the activated carbon is formed from one or more of bituminous coal, sub-bituminous coal, lignite coal, anthracite coal, wood, peat, nut shells, pits, coconut, babassu nut, macadamia nut, dende nut, peach pit, cherry pit, olive pit, walnut shell, wood, bagasse, rice hulls, corn husks, wheat hulls, polymers, resins, petroleum pitches, and other carbonaceous material.

In some aspects, the techniques described herein relate to a method, wherein calcination occurs at a temperature of at least about 500° C.

In some aspects, the techniques described herein relate to a method, further including treating the sorbent material to prevent reintroduction of oxygen and moisture.

In some aspects, the techniques described herein relate to a method, wherein treating the sorbent to prevent reintroduction of oxygen includes one or more of purging the sorbent material with an inert atmosphere, placing the sorbent within an enclosure with an oxygen scavenging compound, and mechanically removing oxygen from an enclosure that contains the sorbent. 3.

The present disclosure provides a method of purifying a coolant of an electronic component comprising: contacting the coolant with a sorbent, wherein the sorbent is characterized by a gravimetric molasses number of at least 330. In any embodiment, the sorbent may be activated carbon, for example, formed from bituminous coal, sub-bituminous coal, lignite coal, anthracite coal, wood, peat, nut shells, pits, coconut, babassu nut, macadamia nut, dende nut, peach pit, cherry pit, olive pit, walnut shell, wood, bagasse, rice hulls, corn husks, wheat hulls, polymers, resins, petroleum pitches, or other carbonaceous material. In any embodiment, the sorbent may be formed from calcination of a carbonaceous material under an inert atmosphere at a temperature of at least about 500° C. In any embodiment, the sorbent may exhibit an apparent density of about 0.2 g/cm$^3$ to about 1 g/cm$^3$. In any embodiment, the sorbent may exhibit an iodine number of at least about 850 mg/g, such as at least about 1100 mg/g. In any embodiment, the sorbent may have a moisture content of less than about 15 wt. %. In any embodiment, the suitable sorbent has been treated to remove oxygen-containing surface groups, for example, by purging the sorbent with an inert atmosphere, placing the sorbent within an enclosure with an oxygen scavenging compound, and mechanically removing oxygen from an enclosure that contains the sorbent. In any embodiment, the treatment may comprise purging the sorbent with an inert atmosphere.

The sorbent may be used to purify a coolant, which may comprise one or more of an oil, a hydrocarbon, a ketone, an ether, or any fluorinated derivative thereof, optionally having a boiling point of about 34° C. to about 175° C. and a dielectric constant of less than about 10 at 1 kHz. In any embodiment, a suitable coolant may exhibit a kinematic viscosity of not more than about 0.8 cSt.

In any embodiment, the electronic component being cooled with the coolant may be a printed circuit board (PCB). Cooling may be carried out by contacting the electronic component with the coolant. In any embodiment, the coolant may be filtered through a size exclusion filter.

The present disclosure additionally provides an equipment assembly or system for purifying a coolant of an electronic component comprising a coolant and an enclosure comprising a sorbent, wherein the enclosure is configured to contact the sorbent with the coolant and wherein the sorbent is characterized by a molasses number of at least about 330. In any embodiment, the sorbent may have been purged with nitrogen to remove oxygen-containing surface groups. In any embodiment, the sorbent may be provided as inertly-packed or vacuum packed in the enclosure. The equipment assembly may further comprise a pump that conveys the coolant through the sorbent. In any embodiment, the coolant may be one or more of an oil, a hydrocarbon, a ketone, an ether, or any fluorinated derivative thereof, optionally having a boiling point of about 34° C. to about 175° C., a freezing point of about −38° C. to about −138° C., and a dielectric constant of less than about 10 at 1 kHz. In any embodiment, the coolant may be used to cool an electronic component housed within a data center. Optionally, the coolant may be filtered after passing through the enclosure, for example, by conveying the coolant through a size-exclusion filter connected downstream of the enclosure comprising the sorbent.

DRAWINGS

Aspects, features, benefits, and advantages of the embodiments described herein will be apparent with regard to the following description, appended claims, and accompanying drawings where:

Figure 3:
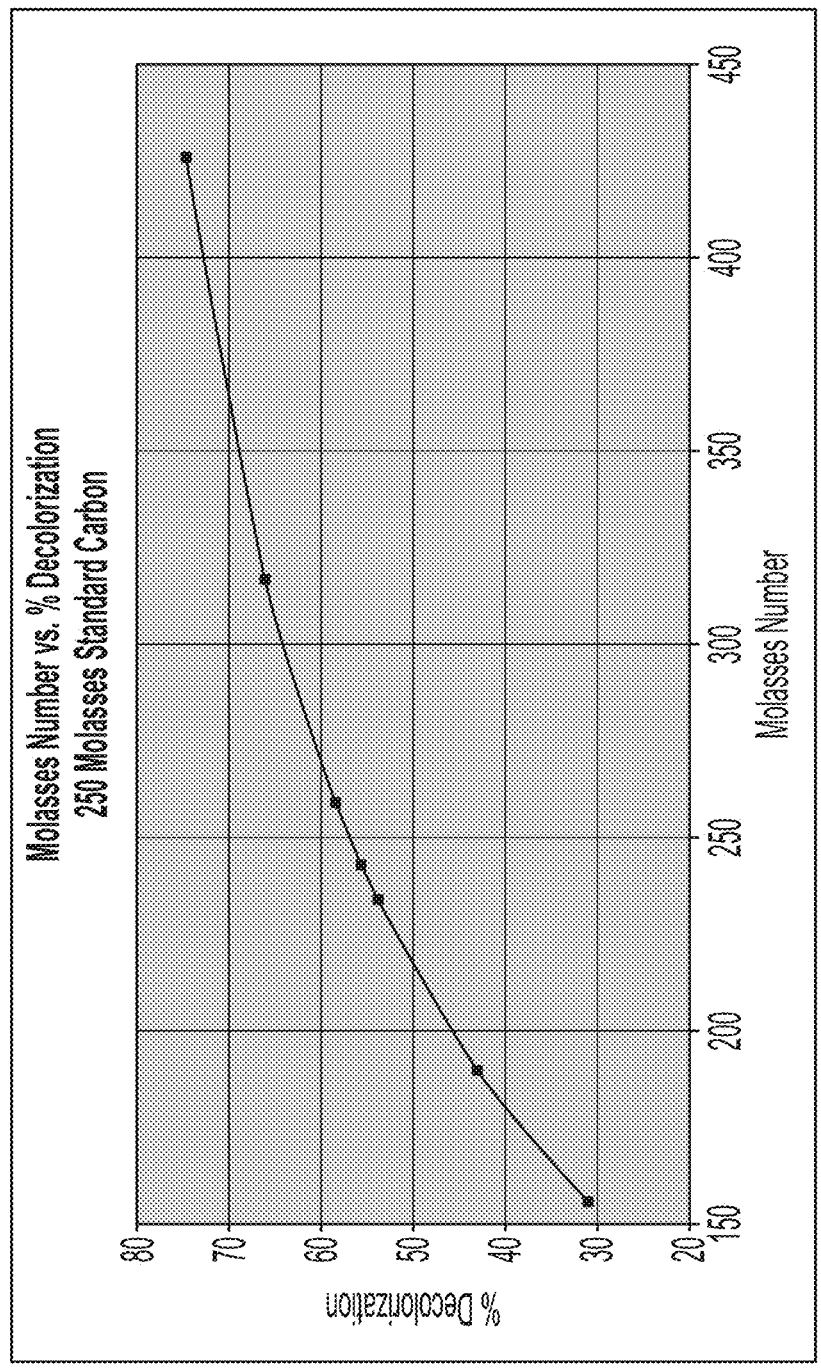

FIG. 3 plots the decolorization curve a sorbent material, which measures the relative amount of decolorization achieved versus the measured molasses number of the sorbent material.

Figure 4:
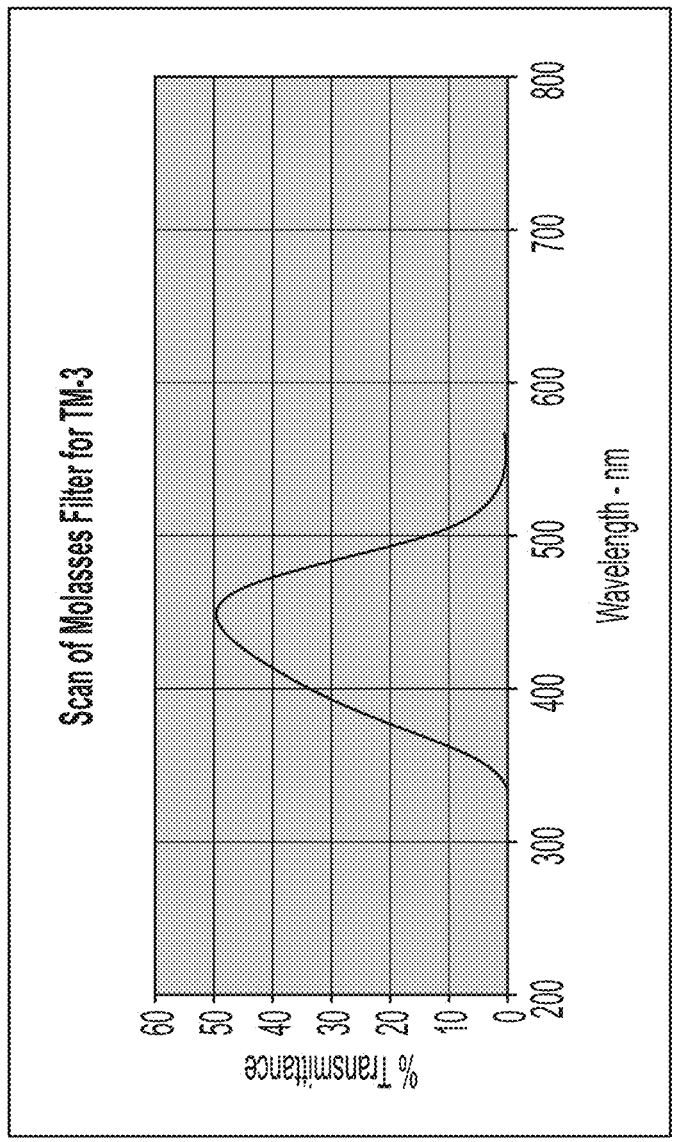

FIG. 4 depicts an example of a spectral scan, which depicts the transmittance of a molasses filter as a function of the wavelength of light.

Figure 5:
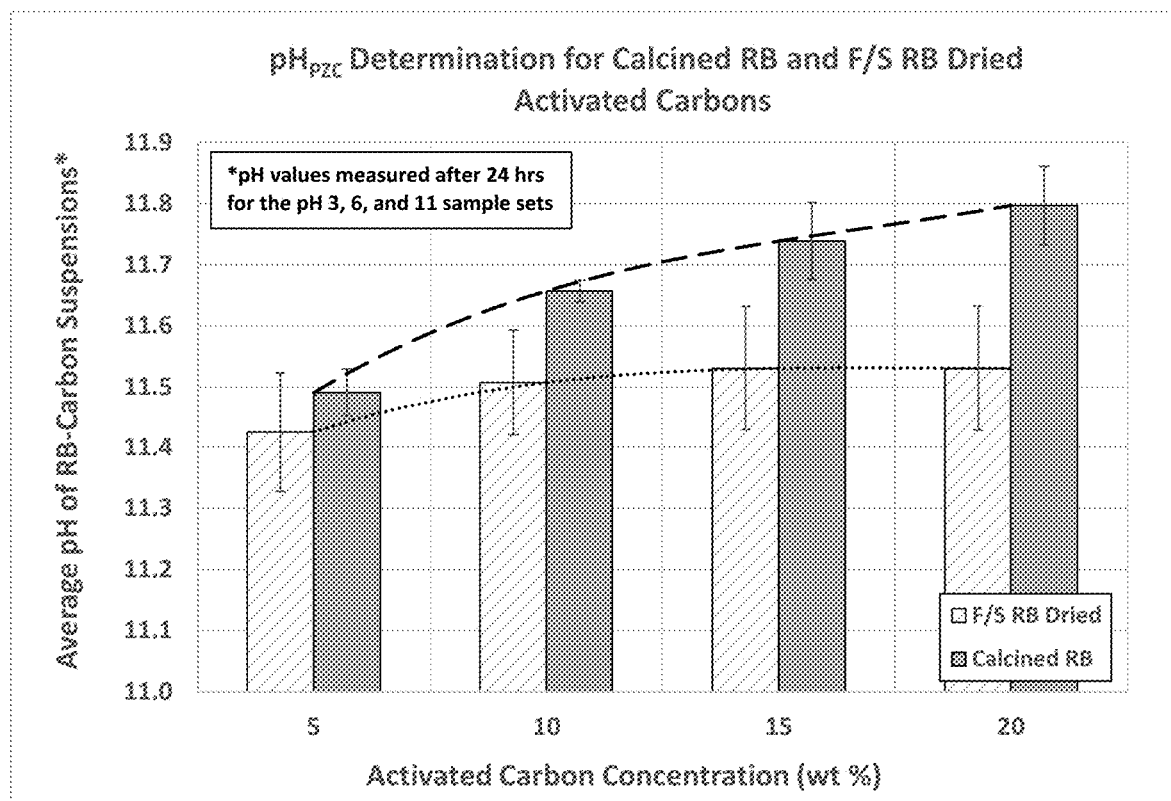

FIG. 5 depicts average pH measurements at common activated carbon concentrations of 5 wt. %, 10 wt. %, 15 wt. %, and 20 wt. % for the F/S RB Dried or Calcined RB-sodium nitrate suspensions.

Figure 6:
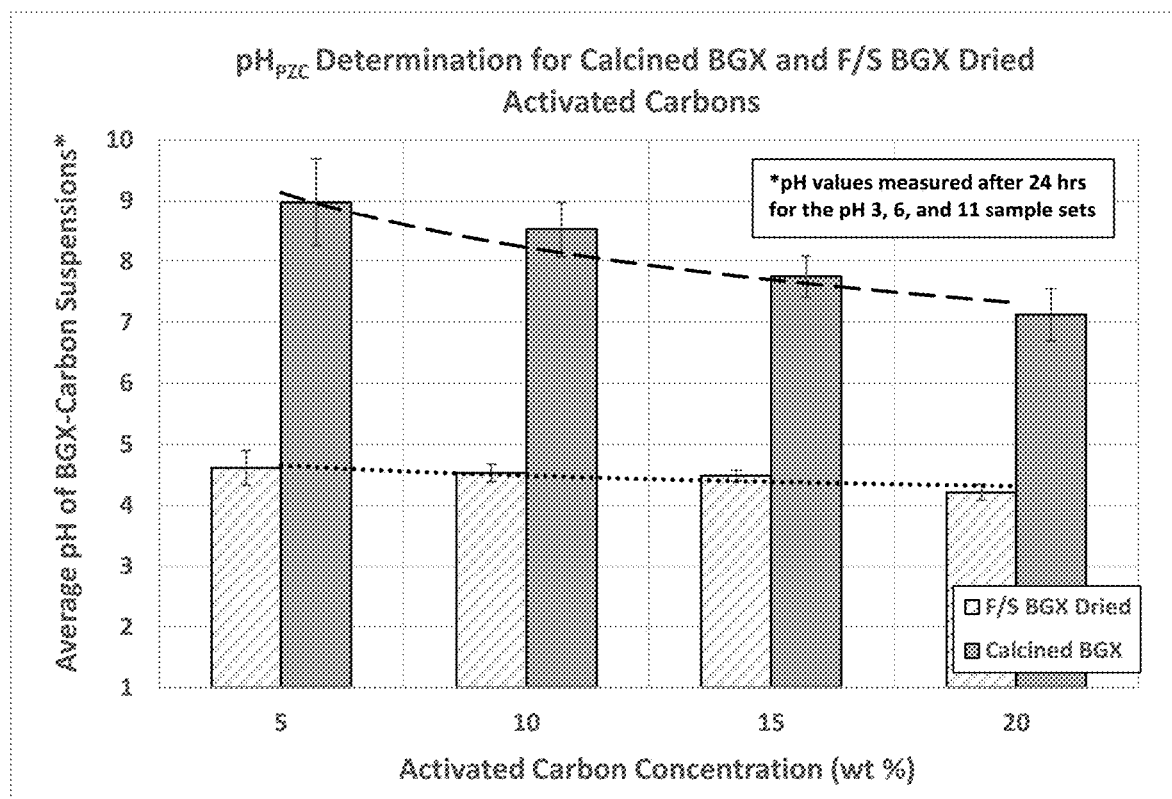

FIG. 6 depicts average pH measurements at common activated carbon concentrations of 5 wt. %, 10 wt. %, 15 wt. %, and 20 wt. % for the F/S BGX Dried or Calcined BGX-sodium nitrate suspensions.

DETAILED DESCRIPTION

Before the present compositions and methods are described, it is to be understood that the scope of the invention is not limited to the particular processes, compositions, or methodologies described, as these may vary. It is also to be understood that the terminology used in the description is for the purpose of describing the particular versions or embodiments only, and is not intended to limit the scope of the present invention which will be limited only by the appended claims. Unless defined otherwise, all technical and scientific terms used herein have the same meanings as commonly understood by one of ordinary skill in the art. Although any methods and materials similar or equivalent to those described herein can be used in the practice or testing of embodiments of the present invention, the preferred methods, devices, and materials are now described. All publications mentioned herein are incorporated by reference with respect to the aspect it is identified as describing. Nothing herein is to be construed as an admission that the invention is not entitled to antedate such disclosure by virtue of prior invention.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

As used herein, the term "about" means plus or minus 10% of the numerical value of the number with which it is being used. For example, "about 50%" means in the range of 45-55%.

As used herein, the terms "electronics rack" includes any housing, frame, rack, compartment, blade server system, or the like having one or more heat-generating components of a computer system, electronic system, or information technology equipment, and may be, for example, a standalone computer processor having high-, mid- or low-end processing capability. As used herein, "electronic component" refers to any heat generating electronic component of, for example, a computer system or other electronics unit requiring cooling. By way of example, an electronic component may comprise one or more integrated circuit dies and/or other electronic devices to be cooled, including one or more processor dies, memory dies or memory support dies. As used herein, "data center" refers to a computer installation containing one or more electronics racks to be cooled. As a specific example, a data center may include one or more rows of rack-mounted computing units, such as server units. A data center may include random access memory (RAM), one or more processing resources such as a central processing unit (CPU) or hardware or software control logic, ROM, and/or other types of nonvolatile memory. Additional components of the data center may include one or more disk drives, one or more network ports for communicating with external devices as well as various input and output (I/O) devices, such as a keyboard, a mouse, and a video display. Such data centers, electronic components, or electronics racks frequently contain one or more systems that are operable to transmit data between the various electronic components or within the data centers, electronic components, or electronics racks themselves, and such systems are referred to as a data bus within an electronics rack or a network when it connects several data centers or electronic racks. Such systems can also be referred to as networks or computer networks.

As used herein, the term "sorbent material" means any material that exhibits adsorbent properties, absorbent properties, or a combination of adsorbent properties and absorbent properties. Adsorbent properties mean that atoms, ions, or molecules adhere to the surface of the material. Absorbent properties means that atoms, ions, or molecules enter and are retained by a bulk phase of the material. By way of example, sorbent materials include but are not limited to activated carbon, reactivated carbon, natural and synthetic zeolite, silica, silica gel, alumina, zirconia, and diatomaceous earths. As used herein, "sorbent material" is a material whose constituent components are substantially adsorbent and/or absorbent, with only minimal components that are not adsorbent and/or absorbent (for example, the minimal amount of binder that is required for activated carbon pellets to maintain their shape).

As used herein, the term "sorbent" means any composition or composite that includes a sorbent material in a blend, mixture, composite, or compound with one or more additional materials that do not exhibit adsorbent or absorbent properties. By way of example, one embodiment of sorbent includes an activated carbon sorbent material mixed with a thermally conductive filler.

As used herein, "conductive contaminants" include any materials that can increase, either themselves or by acting on other materials, the electrical conductivity between circuits, traces, or other electrical devices or components found within an electronics rack or data center. Examples of conductive contaminants are not limited to and include one or more of metallic debris such as aluminum, copper, steel, lead, tin, silver, gold, cadmium, arsenic, selenium, nickel, mercury, zinc, and other metals and alloys thereof, solders, fluxes, water, salts, ions, carbon particles, ceramics, electrically conductive polymers, resists, and the like.

The sorbents or the sorbent materials described herein may be characterized by a variety of properties such as density, porosity, and transport structure (via gravimetric molasses number), oxygen level, and mixture level. Standardized methods from ASTM International may be used to characterize many of these various properties. For example, pore (or void) volume may be determined using ASTM D4284-12(2017)e1 or an equivalent thereof. Pores may be characterized into three general size ranges. Micropores exhibit a pore diameter of less than about 2 nm. Mesopores range from 2 nm to 50 nm in diameter while macropores have a diameter greater than 50 nm. Particle size distribution may be determined according to ASTM D2862-16 or an equivalent thereof. Moisture content may be determined using ASTM D2867-17 or an equivalent thereof. Gravimetric iodine number may be determined using standard test method ASTM D4607-14 or an identical industry test, for example Calgon Carbon Corporation test TM-4. Note that the gravimetric iodine number may sometimes be referred to as the iodine number.

As used herein, "gravimetric molasses number" or "molasses number" means the determination of the decolorizing capacity of the sorbent or sorbent material in accordance with Calgon Carbon Method Number TM-3 entitled "Determination of the Molasses Number of Activated Carbon." The full test procedure is described fully herein. The gravimetric molasses number is reported as a unitless quantity measured per mass of sorbent or sorbent material.

The sorbent (and therefore, the enclosure and systems of which it is part) may be used to purify a coolant, for example, which has been contaminated during use. For example, one or more components of the data center construction materials (for example, polymers, metals) may leech out and into the coolant. In another example, the coolant may react with one or more components of the construction material, producing reaction products that may contaminate the coolant. These conductive contaminants may increase electrical conductivity of the coolant and therefore pose a risk to the operation of the electronic component/s. As such, systems may be implemented to remove such conductive contaminants. As such, provided herein are assemblies of equipment and methods for their use in purifying a coolant, for example, for purifying a coolant in immersion cooling applications.

Figure 1:
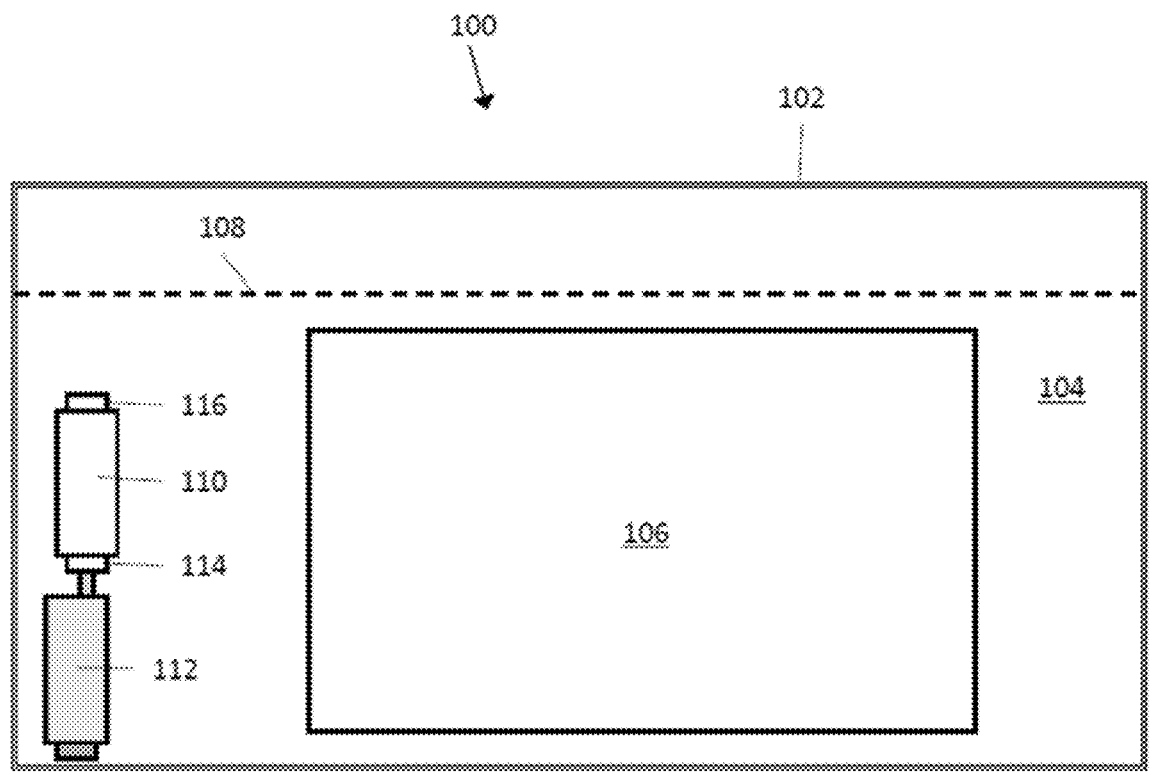
FIG. 1 depicts a schematic representation of an immersion cooling system in which a sorbent as disclosed herein may be used.

Such assemblies comprise a vessel configured to contain a coolant and a sorbent within an enclosure, the enclosure configured to contact the sorbent with the coolant. The assembly may be contained, for example, within a system for immersion cooling, such as an immersion cooling system for data centers or other electronic components that require cooling. As depicted in FIG. 1, such a system 100 may comprise a tank 102 filled with a volume of coolant 104, the electronic component/s 106, and the enclosure 110 comprising the sorbent. The top of the coolant 104 forms a surface 108 corresponding to the level to which the coolant 104 is filled in the tank 102.

Examples of suitable sorbents suitable in the methods and equipment assemblies disclosed herein include, but are not limited to, carbonaceous char, activated carbon, reactivated carbon, natural and synthetic zeolite, silica, silica clay, carbon nanotubes, and graphene. Preferably, the sorbent comprises activated carbon, which will be used hereafter to exemplify various aspects of the method and equipment assemblies suitable for purifying a coolant. Any of the methods and equipment assemblies described herein below, however, may utilize any sorbent as listed above without deviating from the methods and systems contemplated and disclosed herein.

In any embodiment, the sorbent may comprise activated carbon. Activated carbon may be obtained from any known source, such as, but not limited to, bituminous coal, sub-bituminous coal, lignite coal, anthracite coal, wood, peat, nut shells, pits, coconut, babassu nut, macadamia nut, dende nut, peach pit, cherry pit, olive pit, walnut shell, wood, bagasse, rice hulls, corn husks, wheat hulls, polymers, resins, petroleum pitches, other carbonaceous material (for example extruded pellets), or any combination thereof. Commercially available sources of activated carbon include, but are not limited to, ACTICARBONE® activated carbons (available from Calgon Carbon Corporation), such as BGX, which is a granular grade of activated carbon derived from wood/vegetal sources and activated using phosphoric acid, RB (also from Calgon Carbon Corporation), which is activated carbon derived from coal sources, or activated carbon from Kuraray (for example, KURARAY COAL).

In any embodiment, sorbent (activated carbon or otherwise) may be provided in powdered, granular, or pellet form. For example, activated carbon may be provided in powdered form or in granular form, such as (but not limited to) re-agglomerated carbon powder, crushed granules generated from processing (for example, crushing, pulverizing, or the like) those materials listed above. As used herein, granular activated carbon (GAC) refers to activated carbon particles sized to be retained on a 50-mesh sieve (holes of about 0.300 mm). As used herein, powdered activated carbon (PAC) refers to activated carbon particles that pass through an 80-mesh sieve (holes of about 0.180 mm).

Activated carbon may be formed by processes well known in the art, for example, by carbonization and activation or by direct activation. For example, raw material such as wood, nutshell, coal, pitch, or the like, may be oxidized and devolatilized with steam and/or carbon dioxide gasified to form pore structures in a carbonaceous material, thereby creating adsorption sites. Oxidation and devolatilization processes may include, for example, a chemical treatment with a dehydrating chemical, such as phosphoric acid, boric acid, sulfuric acid, sodium hydroxide, potassium hydroxide, or any combination thereof.

The performance of a sorbent in a liquid coolant may be improved when one or more of the moisture content and/or the oxygen content of the sorbent is reduced. To reduce the moisture content, a sorbent may be exposed to an absolute pressure that is less than the approximate pressure of the surrounding atmosphere, for example less than about 101,325 Pa (about 101 kPa for atmosphere at sea level) or close to a vacuum. Alternatively or in addition to exposing the sorbent to the above lowered pressure, the sorbent can be heated to a temperature about 100° C., about 125° C., about 150° C., about 175° C., or about 200° C., or a range formed of one or more of the above temperatures.

In some embodiments, the sorbent or the sorbent material may be calcined to remove oxygen. Calcination is a process well-known in the art and may be performed at a temperature of about 500° C. to about 1000° C. under an inert environment. The calcination can be performed at a temperature of about 500° C., about 550° C., about 600° C., about 650° C., about 700° C., about 750° C., about 800° C., about 850° C., about 900° C., about 950° C., about 1000° C., or any range having endpoints that correspond to one or more of the above temperatures.

Sorbent material may be activated to a desired apparent density, molasses number, and iodine number by controlling steam injection rates, temperature, residence time, and content of the activating gas (for example, steam, carbon dioxide, or the like). One of skill in the art will be able to determine suitable activation conditions and optimize as needed to provide a sorbent having the desired disclosed properties.

For example, a sorbent, such as activated carbon, suitable in the methods and systems disclosed herein may exhibit an apparent density of about 0.2 g/cm³ to about 1 g/cm³ such as about 0.3 g/cm³ to about 0.7 g/cm³, about 0.2 g/cm³ to about 0.4 g/cm³, or about 0.2 g/cm³ to about 0.5 g/cm³. Additionally or alternatively, a sorbent, such as activated carbon, may exhibit an iodine number of at least about 800 mg/g, such as about 800 mg/g to about 2000 mg/g, about 900 mg/g to about 1500 mg/g, or about 1000 mg/g to about 1500 mg/g, or about 900 mg/g, about 1000 mg/g, about 1100 mg/g, about 1200 mg/g, about 1300 mg/g, about 1400 mg/g, about 1500 mg/g, about 1600 mg/g, about 1700 mg/g, about 1800 mg/g, about 1900 mg/g, or about 2000 mg/g. Suitable sorbent, such as activated carbon, may be characterized by a gravimetric molasses number of at least about 150, such as about 150 to about 200 (for example, if coconut-based), about 200 to about 600 (for example, if coal-based), or about 1000 to about 6000 (for example, if wood-based), or a gravimetric molasses number of about 150, about 160, about 170, about 180, about 190, about 200, about 210, about 220, about 230, about 240, about 250, about 260, about 270, about 280, 290, about 300, about 350, about 400, about 450, about 500, about 550, about 600, about 650, about 700, about 750, about 800, about 850, about 900, about 950, about 1000, about 1100, about 1200, about 1300, about 1400, about 1500, about 1600, about 1700, about 1800, about 1900, about 2000, about 2100, about 2200, about 2300, about 2400, about 2500, about 2600, about 2700, about 2800, about 2900, about 3000, or any range that is formed between two or more of the above listed values, or any range of values that are at least greater than any one of the preceding values, such as at least about 150, at least about 200, at least about 250, at least about 300, at least about 350, or at least about 400. The gravimetric molasses number of a sorbent that has been calcined may be higher than the gravimetric molasses of a sorbent that has not been calcined. An activated carbon from any source feedstock that has a molasses number of at least about 150 is encompassed by the present disclosure and suitable for use in the methods and systems disclosed herein. Suitable sorbent in accordance with the disclosure, such as but not limited to activated carbon, has a moisture content of less than about 15 wt. %, less than about 14 wt. %, less than about 13 wt. %, less than about 12 wt. %, less than about 11 wt. %, less than about 10 wt. %, less than about 9 wt. %, less than about 8 wt. %, less than about 7 wt. %, less than about 6 wt. %, less than about 5 wt. %, less than about 4.5 wt. %, less than about 4.0 wt. %, less than about 3.5 wt. %, less than about 3.0 wt. %, less than about 2.5 wt. %, less than about 2.0 wt. %, less than about 1.5 wt. %, less than about 1.0 wt. %, less than about 0.5 wt. %, or about 15 wt. %, about 14 wt. %, about 13 wt. %, about 12 wt. %, about 11 wt. %, about 10 wt. %, about 9 wt. %, about 8 wt. %, about 7 wt. %, about 6 wt. %, about 5 wt. %, about 4.5 wt. %, 4.0 wt. %, about 3.5 wt. %, about 3.0 wt. %, about 2.5 wt. %, about 2.0 wt. %, about 1.5 wt. %, about 1.0 wt. %, or about 0.5 wt. %, or about 0.1 wt. %, or any range that is formed from two or more of the preceding values as endpoints. In certain embodiments, less than about 5 wt. % of the sorbent, regardless of source, has a particle diameter of 40 mesh (US) or 0.425 mm or less, as determined by ASTM D2862-16 (or an equivalent thereof). Suitable sorbent additionally may have an ash content not exceeding about 23 wt. %. Suitable sorbent may, for example, have an ash content of about 23% or less, such as about 20% or less, about 15% or less, about 10% or less, 5%, or about 3% or less.

In any embodiment, a sorbent, such as activated carbon, may be treated to desorb or reacted (oxidized) surface products, the presence of which may be measured by any known method such as through X-ray photoelectron spectroscopy (XPS), thermogravimetric analysis (TGA), elemental analysis, temperature program desorption, Fourier-transform infrared (FTIR) spectroscopy, Boehm Titration, water adsorption, moisture balance, or ascertaining mass differences of activated carbon pre- and post-drying, or any combination thereof.

In any embodiment, a sorbent which has reduced oxygen content (either in terms of bulk oxygen or surface oxygen) may be formed by calcining a precursor sorbent material at a temperature of at least about 500° C., for example, about 500° C. to about 1000° C., or any value within this range, such as about 500° C., about 550° C., about 600° C., about 650° C., about 700° C., about 750° C., about 800° C., about 850° C., about 900° C., about 950° C., or about 1000° C., to thereby form a sorbent material. After calcination, the sorbent material is cooled under an inert atmosphere. The process of calcination is the primary driver for the reduction of moisture and bulk oxygen in the resulting sorbent, while cooling the sorbent in an inert atmosphere serves to substantially prevent the reintroduction of moisture or oxygen into the sorbent after it has been calcined. The calcination process is not limited and includes exposing the sorbent to at least one of the preceding temperatures described in this paragraph under an inert atmosphere. The inert atmosphere is not limited so long as it does not result in there by additional surface functionality or activity of the sorbent. Examples of such inert atmosphere include one or more of the noble gases such as helium, neon, argon, krypton, xenon, and in certain conditions where catalytic functionality is not imparted, the inert atmosphere can be nitrogen gas, and also in certain embodiments the calcination can be performed under a vacuum.

For example, a sorbent may be provided after having been purged under nitrogen to remove oxygenated surface groups or moisture. Optionally, a sorbent may be packaged and provided in a vacuum-packed enclosure, which may be carried out, for example, according to the methods disclosed in U.S. Pat. No. 6,131,368 which is incorporated by reference herein in its entirety. For example, the sorbent may be warmed, then cooled under nitrogen within a gas-impermeable packaging material (for example, a bag) to sufficiently create a vacuum within the packaging material, at which point the packaging material may be hermetically sealed. For example, in any embodiment where the sorbent comprises activated carbon, carbonaceous material may be heated to about 500° C. to about 1000° C. under an inert atmosphere, calcined for a desired amount of time, then cooled in an inert atmosphere to 100° C., loaded into packaging material under the inert atmosphere, then further cooled and sealed, still under the inert atmosphere.

The bulk oxygen content of the sorbent material should be limited in order to avoid the sorbent material reacting with conductive contaminants in the coolant. For example, the bulk oxygen content can be no more than about 15 wt. %, no more than about 14 wt. %, no more than about 13 wt. %, no more than about 12 wt. %, no more than about 11 wt. %, no more than about 10 wt. %, no more than about 9 wt. %, no more than about 8 wt. %, no more than about 7 wt. %, no more than about 6 wt. %, no more than about 5 wt. %, no more than about 4 wt. %, no more than about 3 wt. %, no more than about 2 wt. %, or no more than about 1 wt. %. For example, the bulk oxygen content can be in a range of about 1 wt. % to about 15 wt. %, about 1 wt. % to about 10 wt. %, or about 1 wt. % to about 5 wt. %.

The present disclosure additionally provides a method for purifying a coolant with the sorbent as described above, the method comprising contacting the coolant with the sorbent under condition effective to transfer a conductive contaminant in the coolant to the sorbent, for example, by absorption or adsorption. Examples of suitable sorbents suitable in the methods and systems disclosed herein include, but are not limited to, carbonaceous char, activated carbon, reactivated carbon, natural and synthetic zeolite, silica, silica clay, carbon nanotubes, and graphene. For example, a suitable sorbent, such as activated carbon, may exhibit an apparent density of about 0.2 g/cm$^3$ to about 1 g/cm$^3$ such as about 0.3 g/cm$^3$ to about 0.7 g/cm$^3$, about 0.2 g/cm$^3$ to about 0.4 g/cm$^3$, or about 0.2 g/cm$^3$ to about 0.5 g/cm$^3$. Additionally or alternatively, a sorbent, such as activated carbon, may exhibit an iodine number of at least about 800 mg/g, such as about 800 mg/g to about 2000 mg/g, about 900 mg/g to about 1500 mg/g, or about 1000 mg/g to about 1500 mg/g. Suitable sorbents, such as activated carbon, may be characterized by a gravimetric molasses number of at least about 150, such as about 150 to about 250 (for example, if coconut-based) about 330 to about 600 (for example, if coal-based) or about 1000 to about 6000 (for example, if wood-based). Suitable sorbent may also have a moisture content of less than about 15%, such as less than about 10%, less than about 2.5%, or about 0.01% to about 2.5%. Preferably, less than about 5 wt. % of the sorbent, regardless of source, has a particle diameter of 40 mesh (US) or 0.425 mm or less, as determined by ASTM D2862-16 (or an equivalent thereof). Suitable sorbent additionally may have an ash content not exceeding about 23 wt. %. Suitable sorbent may, for example, have an ash content of about 23% or less, such as about 20% or less, about 15% or less, about 10% or less, 5%, or about 3% or less.

In order to effectively contact the coolant with the sorbet, a sorbent may be provided in a form suitable for passively or actively filtering the coolant. For example, returning to FIG. 1, a sorbent may be provided in cartridge form to be used in combination with an enclosure 110 such that the cartridge may be exchanged as needed. An enclosure 110 may comprise an inlet 114 and outlet 116 to actively convey coolant through the sorbent cartridge within the enclosure 110. One of skill in the art will be familiar with methods and equipment suitable for use of a pump to convey coolant through a sorbent filter. For example, any commonly used as an automotive fuel pump may be used. Alternatively, the enclosure may itself be permeable to the coolant, for example, having perforated walls, where coolant may contact the sorbent passively. This configuration may be particularly useful where smaller volumes of coolant are required and diffusion of conductive contaminants to the filter is sufficient for their removal. Optionally, an enclosure may additionally contain or be connected to a size-exclusion filter downstream of the sorbent to capture any sorbent material that is swept out in the effluent of the enclosure comprising the sorbent. For example, a filter may be about 325 mesh to about 40 mesh, such as about 200 mesh to about 40 mesh, about 100 mesh to about 40 mesh, or about 80 mesh to about 40 mesh. As used herein, the mesh sizes correspond to US sizes, where 325 mesh corresponds to an opening size of 44 μm, 200 mesh corresponds to an opening size of about 75 μm, 100 mesh corresponds to an opening size of about 150 μm, 80 mesh corresponds to an opening size of about 180 μm, and 40 mesh corresponds to an opening size of about 425 μm.

A sorbent may be provided in an enclosure in an amount that is about two to three times the mass of anticipated contamination in the coolant, an amount which is less than is presently recommended in the art. For example, the total amount of the elastomeric mass that will be contacted by the coolant may be totaled, followed by making an assumption that between about 0.1% (if relatively clean) to about 25% (in extreme cases) of that mass is contamination that may leech into the coolant. In any embodiment, for example, about 200 g of sorbent may be used to remove conductive contaminants from up to about 800 L of coolant. A method for purifying coolant may comprise, in any embodiment, removing the sorbent and replacing said sorbent with fresh sorbent. Optionally, the sorbent, particularly in embodiments where the sorbent comprises activated carbon, the sorbent may be reactivated or calcined by any methods known in the art for doing so.

The immersion cooling system, equipment assembly, and sorbent contained therein are not particularly limited with regard to compatible coolants and may be used to purify any coolant that is suitable for use in cooling electronic components. One of skill in the art will be familiar with a variety of useful coolants as well as the desired properties thereof. Generally, immersion cooling utilizes either a single phase or a two-phase cooling system to dissipate heat generated by the electronic component/s. Coolant in a single-phase cooling system generally is provided in liquid phase and remains in liquid phase throughout cooling, using convection, mechanical agitation, or a combination thereof to dissipate energy transferred from the electronic components to the coolant. The direction of energy flow (from device or to device) is determined by the relative energy (that is, the temperature) difference between the device and the heat transfer mechanism. In a two-phase system, coolant is generally provided as a liquid as well. Heat formed at the surface of the electronic components will transfer to the liquid coolant, vaporizing it to form gas bubbles, which rise to the surface of the liquid coolant. A condenser located above the surface of the liquid coolant may be operated at a temperature below that of the condensation temperature of the rising vapor, thereby condensing the vaporized coolant back to its liquid phase.

In any application, a coolant suitable for cooling electronic component may have a dielectric constant and electrical conductivity low enough to avoid any circuitry issues with the electronic component. For example, a suitable coolant may have a dielectric constant (for example, as determined by ASTM D924) of less than about 10 at 1 kHz (for example, about 0.1 to about 10), preferably less than about 7.5 (for example, about 0.1 to about 7.5). Suitable coolants may have an electrical resistivity (for example, as determined by ASTM D257-14) of less than about $10^8$ Ω·cm to about $10^{15}$ Ω·cm.

Additionally, a coolant may have a thermal conductivity and specific heat sufficient to transfer energy away from the electronic component as well as a viscosity that allows the coolant to move freely. For example, a suitable coolant may have a specific heat (for example, as determined by ASTM E1269-11(2018)) of about 1000 J/kg·K to about 1350 J/kg·K. A suitable coolant may have a thermal conductivity (for example, as determined by ASTM D2717-86) of about 0.05 W/m°C. to about 0.5 W/m°C. A suitable coolant may have a kinematic viscosity (for example, as measured by ASTM D341-77) of not more than about 0.80 cSt, such as about 0.25 cSt to about 0.80 cSt.

A coolant suitable for use in a single-phase cooling system, for example, may exhibit a high atmospheric boiling point. In a two-phase cooling system, a coolant may have a boiling point that is lower than the working surface temperature of the electronic component (to ensure vaporization at the interface), but the boiling point is higher than the ambient working temperature so as to ensure that the bulk of the coolant remains in liquid phase during typical operating conditions. For example, a suitable coolant in a two-phase system might have a boiling point of about 34° C. to about 175° C., about 40° C., about 45° C., about 50° C., about 55° C., about 60° C., about 65° C., about 70° C., about 75° C., about 80° C., about 85° C., about 90° C., about 95° C., about 100° C., about 105° C., about 110° C., about 115° C., about 120° C., about 125° C., about 130° C., about 135° C., about 140° C., about 145° C., about 150° C., about 155° C., about 160° C., about 165° C., about 170° C., or about 175° C. A coolant in a two-phase system may also exhibit a high latent heat of evaporation.

A coolant may be a single fluid or may be a mixture of fluids. Examples of suitable coolants include, but are not limited to, oils (for example, mineral oils, vegetable oils, castor oil, silicone oils), ketones and perfluorinated ketones (for example, NOVEC 649 or NOVEC 774 sold by 3M Company), hydrocarbons and perfluorinated hydrocarbons (for example, FC-72, FC-84, FC-3284, FC-3283, FC-40 sold by 3M Company), polyphenyl ether or hydrofluoroether (HFE) fluids (for example, SANTOVAC 5 pump fluid, NOVEC 7000, NOVEC 7100, NOVEC 7200, NOVEC 7300, NOVEC 7500, or NOVEC 7700 sold by 3M Company), hydrofluoroether olefins (HFEOs), hydrofluoroolefins (HFOs), hexafluoropropylene trimer (for example, such as disclosed in U.S. Pat. No. 10,662,359, which is incorporated herein by reference in its entirety including to its disclosure of the trimer), diphenyl ether/biphenyl, or any mixture thereof. In some embodiments, the coolant is filtered through a size-exclusion filter.

Figure 2:
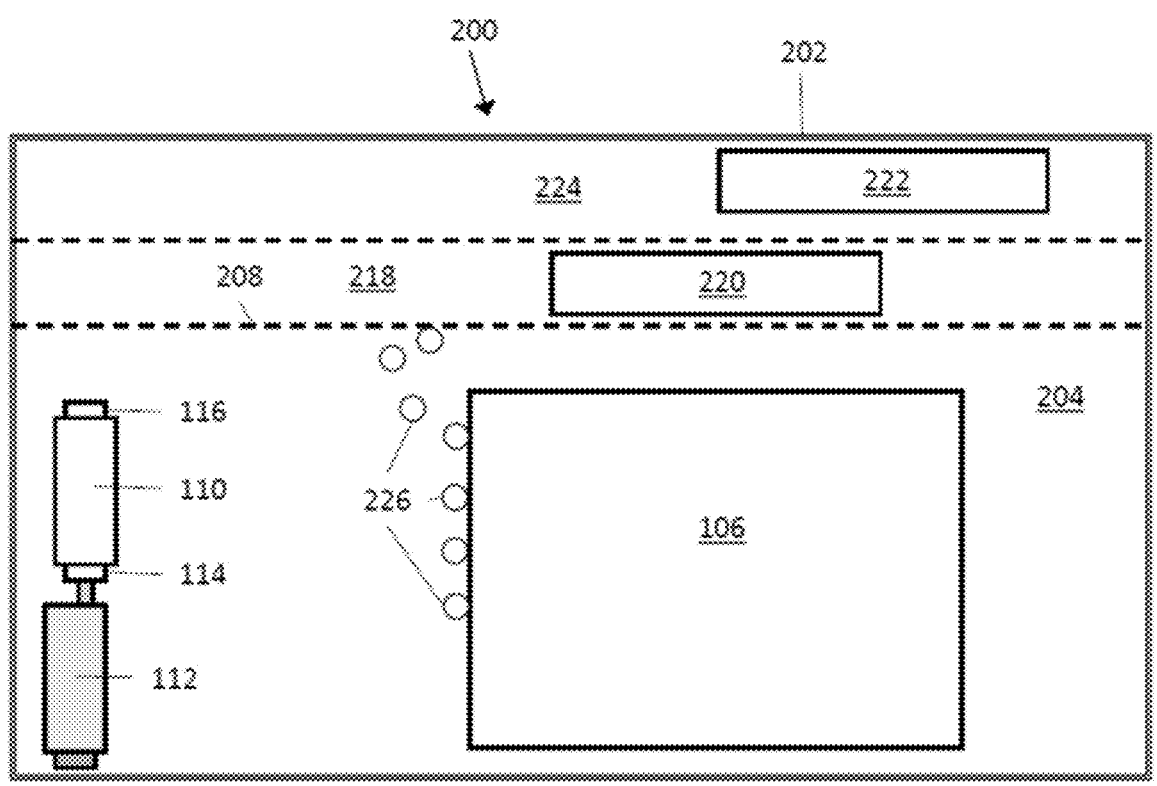
FIG. 2 depicts a schematic representation of a two-phase immersion cooling system in which a sorbent as disclosed herein may be used.

An immersion cooling system utilizing a sorbent as disclosed herein may further comprise components in addition to those listed above. As shown in FIG. 1, the coolant 104 as well as the electronic component 106 is contained within a tank 102, which may be made from welded metal (for example, carbon steel, aluminum, stainless steel) or glass and insulated to prevent heat loss. A tank may be sufficiently sized to hold coolant sufficient to cool an electronic component therein. For example, a tank may be about 500 L, about 550 L, about 600 L, about 650 L, about 700 L, about 750 L, about 800 L, about 850 L, about 900 L, about 950 L, or about 1000 L. In a two-phase cooling system 200, such as that shown in FIG. 2, there is provided a tank 202 having a volume of coolant 204 and an electronic component 106 contained therein. Also contained within the tank 202 is an enclosure 110 which comprises a sorbent. The enclosure 110 may comprise an inlet 114 and an outlet 116, and in some embodiments the enclosure 110 may be connected to a pump 112. In the two-phase cooling system 200, vaporized coolant 226 rising to the coolant surface 208 will produce, above the coolant surface 208, a headspace of vapor called the vapor zone 218. A two-phase cooling system 200 may thus additionally comprise a condenser 220 located within the vapor zone 218 to re-liquefy vaporized coolant. A two-phase system may also comprise desiccant 222 to collect water that migrates to the headspace 224 above the vapor zone. Desiccant 222 may thus be located above the vapor zone 218 and be provided in an amount sufficient to collect the anticipated water, such as in an amount of at least five times the anticipated water mass.

In any of the configurations disclosed herein, there is the possibility that particles of the sorbent become entrained in the coolant as the coolant contacts the sorbent. Therefore, it is contemplated to optionally include within systems described in this disclosure at least one size exclusion filter that removes or otherwise prevents particles of sorbent from entering the coolant as it flows. Immersion cooling systems and equipment assemblies may additionally comprise pressure-control, for example, through a bellow connected to a mechanical and pressure switch controlling a solenoid valve, as well as pumps for controlling fluid levels, heat sources, heat sinks, refrigeration systems, active or passive temperature control systems, heat exchangers, or any combination thereof.

There is provided a method of purifying a coolant of an electronic component comprising: contacting the coolant with a sorbent, wherein the sorbent is characterized by a gravimetric molasses number of at least 330.

In some embodiments, the sorbent is activated carbon.

In some embodiments, the activated carbon is formed from one or more of bituminous coal, sub-bituminous coal, lignite coal, anthracite coal, wood, peat, nut shells, pits, coconut, babassu nut, macadamia nut, dende nut, peach pit, cherry pit, olive pit, walnut shell, wood, bagasse, rice hulls, corn husks, wheat hulls, polymers, resins, petroleum pitches, and other carbonaceous material.

In some embodiments, the sorbent is formed from calcination of a carbonaceous material under an inert atmosphere at a temperature of at least about 500° C.

In some embodiments, the sorbent has an apparent density of about 0.2 g/cm$^3$ to about 1 g/cm$^3$.

In some embodiments, the sorbent has an iodine number of at least about 850 mg/g.

In some embodiments, the sorbent has an iodine number of at least about 1100 mg/g.

In some embodiments, the sorbent has a moisture content of less than about 15 wt. %.

In some embodiments, the sorbent has been treated to remove oxygen-containing surface groups.

In some embodiments, the treatment to remove oxygen-containing surface groups comprises one or more of purging the sorbent with an inert atmosphere, placing the sorbent within an enclosure with an oxygen scavenging compound, and mechanically removing oxygen from an enclosure that contains the sorbent.

In some embodiments, the treatment comprises purging the sorbent with an inert atmosphere.

In some embodiments, the coolant comprises one or more of an oil, a hydrocarbon, a ketone, an ether, or any fluorinated derivative thereof.

In some embodiments, the coolant has a boiling point of about 34° C. to about 175° C. and a dielectric constant of less than about 10 at 1 kHz.

In some embodiments, the coolant has a kinematic viscosity of not more than about 0.8 cSt.

In some embodiments, the electronic component is a printed circuit board (PCB).

In some embodiments, the method further comprises contacting the electronic component with the coolant.

In some embodiments, the method further comprises conveying an effluent of the enclosure comprising the sorbent through a size exclusion filter.

There is provided a system for purifying a coolant of an electronic component comprising: a coolant and an enclosure comprising a sorbent, wherein the enclosure is configured to contact the sorbent with the coolant, wherein the sorbent is characterized by a molasses number of at least 330.

In some embodiments, the sorbent has been purged with nitrogen to remove oxygen-containing surface groups.

In some embodiments, the sorbent is inertly-packed or vacuum packed in the enclosure.

In some embodiments, the system further comprises a pump that conveys the coolant through the sorbent.

In some embodiments, the coolant comprises one or more of an oil, a hydrocarbon, a ketone, an ether, or any fluorinated derivative thereof.

In some embodiments, the coolant has a boiling point of about 34° C. to about 175° C., a freezing point of about −38° C. to about −138° C., and a dielectric constant of less than about 10 at 1 kHz.

In some embodiments, the electronic component is housed within a data center.

In some embodiments, the system further comprises a size-exclusion filter connected downstream of the enclosure comprising the sorbent.

EXAMPLES

Before the Examples are described, the test methods shall be fully described.

Determination of the Gravimetric Molasses Number

To determine the gravimetric molasses number, the Calgon Carbon Corporation Test Method Number TM-3 ("TM-3") was utilized. TM-3 is intended to determine the decolorizing capacity of activated carbon. The decolorizing capacity of activated carbon describes the pore structure and material transport of the activated carbon. The determination of the gravimetric molasses number in accordance with TM-3.

Limitations:

The concentration of the molasses solution used for the test is dependent upon a Standard Carbon. As used herein, a "Standard Carbon" is an activated carbon sorbent material that is a reference material for the property of the gravimetric molasses number. As is appreciated by skilled practitioners in the art, a "200 Standard Carbon" can be expected to result in a gravimetric molasses number of 200, a "250 Standard Carbon" can be expected to have a gravimetric molasses number of 250, and so forth. A 200 Standard Carbon must be used for activated carbon products predicted to have less than a 230 gravimetric molasses number. A 250 Standard Carbon must be used for activated carbon products predicted to have less than 350 gravimetric molasses number. A 400 Standard Carbon must be used for activated carbon products predicted to have a 350 or greater gravimetric molasses number. Whenever a product has a molasses specification range that includes a Molasses Standard Carbon limit, the higher Molasses Standard Carbon should be used. In these cases, it is appropriate to include the Molasses Standard Carbon to be utilized on the Product Specification as a note to manufacturing. The molasses solutions cannot be diluted. A fixed path length of 2.5 mm must be used.

As is appreciated by those of skill in the art, the Standard Carbon is not limited so long as it is a suitable reference material for the molasses number. One example of a 400 Standard Carbon is "RB," which is available from Calgon Carbon Corporation of Moon Township, PA. RB is a powdered, steam-activated carbon made from bituminous coal that has a minimum gravimetric iodine number of 1070 mg/g, a gravimetric molasses number of 400, a maximum ash content of 23 wt. %, a maximum moisture content of 2 wt. %, and 60 wt. % to 75 wt. % of particles screened at 325 mesh or having sizes of less than 44 µm. A second example of a 320 Standard Carbon is "RC," which is available from Calgon Carbon Corporation of Moon Township, PA. RC is a powdered, steam-activated carbon made from bituminous coal that has a minimum gravimetric iodine number of 1020 mg/g, a gravimetric molasses number of 320, a maximum ash content of 23 wt. %, a maximum moisture content of 2 wt. %, and 60 wt. % to 75 wt. % of particles screened at 325 mesh or having sizes of less than 44 µm. A third example of a 230 Standard Carbon is "BL," which is available from Calgon Carbon Corporation of Moon Township, PA. BL is a powdered, steam-activated carbon made from bituminous coal that has a minimum gravimetric iodine number of 1000 mg/g, a gravimetric molasses number of 230, a maximum ash content of 10 wt. %, a maximum moisture content of 2 wt. %, and 60 wt. % to 75 wt. % of particles screened at 325 mesh or having sizes of less than 44 µm.

Principle of Method:

A solution of blackstrap molasses is treated with a carbon of unknown decolorizing capacity and with a standard carbon having a molasses number as specified above. The higher Standard Carbon is used to measure values in the flat part of the decolorization curve, as shown in FIG. 3. The absorbance of the filtrates is determined on a standard Spectrophotometer at a wavelength of 472 nm with a path length of 2.5 mm. The molasses number of the sample is calculated from the ratio of the absorbance values of the sample and the standard carbon.

Safety Precautions:

Careful handling and good laboratory techniques should always be used when working with laboratory equipment. The personnel conducting this test should be aware of the potential safety hazards associated with the equipment used in this procedure.

The instruments that were used in TM-3 are set forth in TABLE 1 below:

TABLE 1

| Device or Instrument | Description or Comments: |
|---|---|
| Drying Oven | Electrically heated forced convection drying oven capable of maintaining a constant temperature of 150 ± 5° C. |
| Hotplate/Stirrer | Capable of boiling 50 mL of deionized/distilled water in 3.5 minutes or less; Thermolyne Cimerac 3, Corning Model PC-320 or similar; surface temperature of the hotplate should be maintained at 350 ± 20° F. (177 ± 11° C.). |
| Spectrophotometer | Spectronic ® GenesysTM Spectrophotometer equipped with a filter holder to accommodate the 2.5 mm fixed path cell. Instrument is used at a wavelength of 472 nm. Equivalent Spectrophotometers can be used as long as the 2.5 mm fixed path length cell is used. Allow the instrument to warm up for a period of 30 minutes before using it. If using the Spectronic ® GenesysTM Spectrophotometer, the tungsten bulb has an operation life of 1000 hours. If the instrument is allowed to be on all the time, this would require the bulb be replaced once a month. The instrument has a built in program to keep track of bulb hours and can be accessed in the utilities functions on the instrument. See the manufacturer's instructions for more details. An example of a spectral scan is shown in FIG. 4, which depicts the transmittance of a molasses filter as a function of the wavelength of light. |
| KlettTM Summerson Cell | 2.5 mm fixed path length, optical glass; available from Hellma, 118- 21 Queens Blvd, Forest Hills, NY 11375, 718-544-9534; Part No. 700.011. |
| Beaker | Griffin type, Kimax or Pyrex brand 400 mL. Inspect all beakers to ensure the bottom of the glass is flat. Concave or Convex shaped bottoms will give erratic results. Optional Standardization for Beakers included in Appendix B. Standardization will improve intra-laboratory precision; however, suppliers may not be able to supply consistent beakers over time. |
| Cylinders | Graduated, class A, calibrated to deliver, 50 mL and 1000 mL |
| Pipette | 50 mL volumetric, class A |
| Buchner Funnels | Size D, 71 mm inner diameter |
| Flasks | Filtering flasks with sidearm, 250 mL |
| Filter Paper | Whatman ® No. 3, 7 cm or similar |
| Vacuum Pump | Any unit capable of pulling a vacuum of 27 inches (685.8 mm) of mercury column at 0° C. |
| Balance | Capable of weighing to the nearest 0.1 mg. |
| Digital Thermocouple or Thermometer | Capable of measuring to the nearest tenth of a degree between 10° C. and 120° C., updating the reading at least every second. |
| Stopwatch | |

The reagents that were used in TM-3 are set forth in TABLE 2 below:

TABLE 2

| Reagent | Description or Comments: |
|---|---|
| ASTM Type II water | Conductance (µΩ) <1.0<br>Resistance (MΩ) >1.0<br>As used in the context of TM-3, the term "water" means ASTM Type II water. |
| Filter Paper Suspension | Add 16 circles (torn into quarters) of Whatman ® No. 3 filter paper and one liter of water to a blender. Mix on high for 30 seconds. Transfer to a suitable container. |
| Spectral Standard | Spectro-Chek set available from VWR Scientific, Catalog No. 58019-106. The set consists of four solutions, only two of which will be used to check the instrument in the visible range. Follow the instructions in "Procedure for Monitoring Visible Range, Section A - Variable Wavelength Instruments." This set will monitor deterioration of the |

TABLE 2-continued

| Reagent | Description or Comments: |
|---|---|
| | components over time. It is recommended the standard be checked once a week to verify instrument operation. |
| Molasses Standard Carbon | A 200, 250 and 400 Standard Carbon is available from the Calgon Carbon Corporation Manufacturing Quality Assurance Organization. The 200 Standard Carbon is to be used for all activated carbon products having a predicted molasses number less than 230. The 250 Standard Carbon is to be used for all activated carbon products having a predicted molasses number greater than 230 and less than 350. The 400 Standard Carbon is to be used for all activated carbon products having a predicted molasses number greater than 350 molasses number. A Statistically valid Standard Carbon will be provided in the appropriate range and must be used for the calculations. |
| Internal Carbon Standard | It is recommended to run an internal carbon standard. Obtain a sufficient quantity of carbon having a molasses number between 200 to 300 and pulverize to 95%, −325 mesh. Oven dry the carbon and determine ten (10) replicate molasses number analyses of the carbon. Using the data obtained from the ten replicates, establish an SPC (statistical process control) chart. Use standard SPC guidelines to calculate upper and lower control limits for the carbon. Once the limits are established, analyze the Internal Carbon Standard before analyzing samples. If the result is found to be in-control, proceed with sample analysis. If the result is out-of-control, steps must be taken to determine the cause for the out-of-control result. Once a result is obtained for the Internal Standard Carbon that is in-control, proceed with sample analysis. Continue to plot results and follow standard SPC guidelines for determining out-of-control trends for the Internal Carbon Standard. |
| Blackstrap Molasses | Plantation Brand Blackstrap Molasses (Allied No. 444) purchased from: Allied Old English, Inc. 100 Markley Street Port Reading, NJ 07064 Note: Molasses from other sources will not yield equivalent results and is an important factor in control of test repeatability and reproducibility |
| Molasses Solution | Dilute a sufficient quantity (approximately 50 grams/liter) of blackstrap molasses with one liter of deionized/distilled water (per ASTM Type II) total volume to produce a filtrate with an absorbance of 0.630 to 0.650 when treated with Molasses 200 or 250 Standard Carbon and an absorbance of 0.390 to 0.410 when treated with Molasses 400 Standard Carbon. See Table 3 for Preparation and Standardization of the Molasses Solution for both Standard Carbon. |

The molasses solutions were prepared in accordance with the following procedure:

1. About 50 grams of blackstrap molasses was weighed into a clean, dry beaker and set aside until water was heated to 95° C.
2. Using a graduated cylinder, 1000 mL of ASTM Type 2 water was added to a stainless steel beaker.
3. The beaker was covered with aluminum foil or a large glass cover, placed on a hotplate, and heated to 95° C.
4. When the water reached 95° C., the weighed molasses was transferred to the stainless steel beaker and stirred to mix well. The stainless steel beaker was removed from the hotplate.
5. The solution was cooled to room temperature (about 25° C.).
6. The molasses solution from the stainless steel beaker was siphoned into a suitable container. A piece of TYGON tubing was placed in the beaker so the end of the tubing was one inch off of the bottom of the beaker. A pipette bulb was used to begin the siphon. The solution was syphon into a separate container (for example, a large glass bottle).
7. The remaining beaker content was discarded. The molasses solution was stored in the refrigerator for up to 24 hours. The molasses solution was kept on ice while running the test method.
8. 0.46±0.0002 grams of the 250 Molasses Standard carbon was weighed into a clean, dry, 400 mL beaker.

200 and 250 Standard Carbon Standardization 9. 50 mL of the molasses solution was pipetted into the beaker. The beaker was swirled while adding the molasses solution until the carbon was thoroughly wetted.
10. The beaker was placed on the hotplate and the thermocouple/thermometer was placed in the beaker so the tip rests on the bottom of the beaker. The solution was heated until the thermocouple/thermometer reaches 98° C. and a stopwatch was started. The thermocouple or thermometer was removed and the solution was allowed to boil for 30 seconds.
11. The sample was filtered by vacuum through a Buchner funnel using a Whatman® No. 3 filter paper which was previously prepared. The filter was covered with about 20 mL of the solution and this filtrate was discarded. The remaining portion was filtered.
12. The absorbance of the filtrate on the Spectrophotometer at a wavelength of 472 nm was measured and recorded, using a 2.5 mm fixed path cell. The solution was considered standardized when the absorbance was between 0.630 and 0.650.
13. The solution was considered too dark when the absorbance was greater than 0.650. To determine the amount of water to be added, the amount of molasses solution was measured and multiplied by 0.640 and by the absorbance recorded from step 12. The numbers were subtracted and the result was the amount of water in milliliters to be added to the molasses solution. The water was added and the solution was mixed well. Steps 8-13 were repeated until three successive analyzed samples had absorbance values between 0.630 and 0.650.

14. The solution was considered too light when the absorbance was less than 0.630. To determine the amount of molasses to be added, the amount of molasses solution was measured and multiplied by 0.640 and by the absorbance recorded from step 12. The two numbers were subtracted, the result of the subtraction was divided by 10, and the result of the division was used as the amount (weight) of molasses that was added into a small glass beaker. About 25 mL of the molasses solution was added to the beaker to dissolve the molasses. The beaker was heated on a hotplate to 90° C. and afterward cooled slightly. The contents were added to the molasses solution and mixed well. Steps 8-14 were repeated until three successive samples with absorbance values between 0.630 and 0.650 were obtained.

400 Standard Carbon Standardization 15. 0.46±0.0002 grams of the 400 Molasses Standard carbon was weighed into a clean, dry 400 ml beaker.
16. 50 mL of the molasses solution was pipetted into the beaker. The beaker was swirled while adding the molasses solution until the carbon is thoroughly wetted.
17. The beaker was placed on the hotplate and the thermocouple/thermometer was placed in the beaker so the tip rests on the bottom of the beaker. The solution was heated until the thermocouple/thermometer reaches 98° C. and a stopwatch was started. The thermocouple or thermometer was removed and the solution was allowed to boil for 30 seconds.
18. The sample was filtered by vacuum through a Buchner funnel using Whatman® No. 3 filter paper which was previously prepared. The filter was covered with about 20 mL of the solution and this filtrate was discarded. The remaining 30 mL portion was filtered and used for subsequent measurements.
19. The absorbance of the filtrate on the Spectrophotometer at a wavelength of 472 nm was measured and recorded, using a 2.5 mm fixed path cell. The solution was considered standardized when the absorbance was between 0.390 and 0.410.
20. The solution was considered too dark when the absorbance was greater than 0.410. To determine the amount of water to be added, the amount of molasses solution was measured and multiplied by 0.400 and by the absorbance recorded from step 19. The numbers were subtracted and the result was the amount of water in milliliters that was added to the molasses solution. Water was added and the solution was mixed well. Steps 15-20 were repeated until three successive samples with absorbance values between 0.390 and 0.410 were obtained.
21. The solution was considered too light when the absorbance was less than 0.390. To determine the amount of molasses to be added, the amount of molasses solution was measured and multiplied by 0.400 and by the absorbance recorded from step 19. The two numbers were subtracted, the result of the subtraction was divided by 10, and the result of the division was the amount (weigh) of molasses that was added into a small glass beaker. About 25 mL of the molasses solution was added to the beaker to dissolve the molasses. The resulting solution was heated on a hotplate to 90° C. and then cooled slightly. Contents to the molasses solution was added and mixed well. Steps 15-21 were repeated until three successive samples with absorbance values between 0.390 and 0.410 were obtained.

Optionally, the beakers were standardized. Beaker standardization is intended to identify and eliminate beakers with boiling times that are grossly different from the others being used for the test. Elimination of these beakers improves intra-laboratory precision. When a supplier cannot supply consistent beakers over time, a new mean for all beakers being tested should be established. The mean should not include those beakers that are more than three (3) standard deviations.

The beakers were standardized in accordance with the following procedure:

1. Identify all beakers with number or other specific marking.
2. Using a 50 mL pipette, add 50 mL of deionized/distilled water to each of the 400 mL beakers to be standardized for use in TM-3.
3. Place the beaker on a hotplate and insert the thermocouple or thermometer so it rests on the bottom of the beaker and start the stopwatch.
4. Measure the time it takes for the water in the beaker to reach 95° C. and record the time to the nearest second.
5. Determine the average time for the set of beakers being standardized.
6. Beakers having times ±20 second from the average can be used for sample analysis and standardization for TM-3.
7. Beakers not falling within the 20 second range cannot be used to analyze samples or standards for TM-3.

The samples were analyzed according to the following procedure:

1. A sample of carbon was provided and ground until 95% or more of it passes through a 325 mesh screen. If the sample was not from a recent production, it was dried at 150° C. to a constant weight prior to use. The Standard Carbon internal carbon standards were prepared in the same manner. An equal amount was pulverized to ensure that the fineness of the materials is equivalent.
2. 0.46±0.0002 gram portions of dried, pulverized carbon samples were weighed into separate clean and dry 400 mL beakers.
3. Filtration setups for sample filtration were prepared. A Whatman® No. 3 filter circle was placed in the Buchner funnel. The funnel was connected to the 250 mL filtering flask and the filtration vacuum was initiated. 50 mL of the filter paper suspension was added while making sure to coat the entire surface of the filter paper circle. After all the liquid was drained, the filtrate collected in the filtering flask was discarded.
4. 50 mL of the standardized molasses solution was pipetted into the beaker containing the carbon to be analyzed. The beaker was swirled while adding the molasses solution until the carbon was thoroughly wetted.
5. The beaker was placed on the hotplate and the thermocouple or thermometer was placed in the beaker so the tip rests on the bottom of the beaker. The solution was heated until the thermocouple reads 98° C. and a stopwatch was started. The thermocouple or thermometer was removed and the solution was allowed to boil for 30 seconds.
6. The sample was filtered by vacuum through a Buchner funnel using a Whatman® No. 3 filter paper which was previously prepared according to Step 3. The filter was covered with about 20 mL of the sample and this filtrate was discarded. The remaining portion was filtered.

7. The absorbance of the filtrates on the Spectrophotometer at a wavelength of 472 nm was measured and recorded, using the 2.5 mm fixed path Klett™ Summerson Cell. Deionized or distilled water was used as reference.

8. The molasses number was calculated:

Molasses Number=$(A \times B)/C$ wherein A is the molasses number of the Standard Carbon (250 or other); B is the average absorbance of three determinations for the 250 Standard Carbon or other Standard Carbon; and C is the absorbance of the filtrate of the activated carbon being analyzed.

9. The Molasses Number was reported to the nearest increment of ten using conventional rounding techniques. (for example 226=230)

Determination of Contact pH and Neutralization

To determine contact pH, the Calgon Carbon Corporation Test Method Number TM-62 ("TM-62") was utilized. This method is intended to measure the pH of water in static contact with granular activated carbon at a weight ratio of 1 part carbon to 4 parts water. Requirements to neutralize the mixture can also be determined. The determination of contact pH is performed as described below.

1. Weigh 25.0 g of a representative portion of the granular activated carbon sample into a 400 ml beaker. Unless the sample is from a recent product, oven-dry the sample at 150° C. for 3 hours at and cool to room temperature in a desiccator prior to use.
2. Add 100 ml of Reagent water. Reagent water is described as ASTM D 1193 Type ll. Recently boiled distilled or deionized water generally meets the requirements for Type ll water.
3. Add a magnetic stirring rod and stir the mixture at a slow velocity for 5 minutes.
4. After 5 minutes, stop stirring and allow the carbon to settle for 1 minute
5. Place electrodes in the solution and read the pH value. Report this pH value as the "Contact pH".

After measuring the contact pH, an optional neutralization experiment can be performed via acid or base titration can be performed until an endpoint pH of 7 is reached. In accordance with TM-62 method this is performed as follows:

1. As the mixture is stirring, slowly titrate with the proper reagent. The end point is pH 7 for approximately one minute. If the contact pH is >7 use 0.10 N HCl. If the pH<7, use 0.10 N NaOH.
2. Report "mL of reagent" necessary to achieve neutralization.

Determination of Carbon Suspension Filtrate pH and its Neutralization

This method is designed to determine the amount of acid (0.004 N HCl) or base (0.004 N NaOH) required to titrate the filtrate that results from filtering a 25 g, granular carbon suspension that has been added to 100 mL of deionized water and shaken gently in a 25° C. temperature-controlled water bath for 24 hours. After 24 hours, the granular carbon suspension is filtered using either gravity or vacuum filtration. The initial pH of the filtrate is measured. If the initial pH of the filtrate is >7, then 0.004 N HCl is slowly titrated into the filtrate until a pH 7 end point is reached. One records the volume of 0.004 N HCl required to neutralize the filtrate. With this information, the skilled artisan can compare the alkaline characteristics of different carbons. As will be appreciated by skilled artisans, more alkaline the carbon the more acid will be required to neutralize its filtrate.

Conversely, if the initial pH of the filtrate is <7, then 0.004 N NaOH is slowly titrated into the filtrate until a pH 7 end point is reached. One records the volume of 0.004 N NaOH required to neutralize the filtrate. With this information, one can compare the acidic characteristics of different carbons. The more acidic the carbon, the more acid will be required to neutralize its filtrate.

Determination of Point of Zero Charge pH Via Mass Titration

The point of zero charge (PZC) pH of a carbon, herein referred to as $pH_{PZC}$, describes the pH at which the net carbon surface charge is zero. If comparing two carbons, the one with a higher $pH_{PZC}$ values suggest a more alkaline carbon surface. Conversely, if one compares two carbons the one with a lower the $pH_{PZC}$ is more acidic in nature. The point of zero charge pH was based on a method described in "Valdes H., et al, "Effect of Ozone Treatment on Surface Properties of Activation Carbon", Langmuir, Vol 18, 2002, pp. 2111-2116", the entire contents of which are incorporated by reference herein. To determine the $pH_{PZC}$ the following procedure was followed:

1. Three different 0.1N sodium nitrate ($NaNO_3$) were made created by adding the appropriate amount of the sodium nitrate to boiled deionized water.
2. The pH of the 0.1N sodium nitrate solutions were adjusted to a pH of either 3, 6, or 11 using small additions of either 0.1N nitric acid or sodium hydroxide.
3. For each solution of varying pH, 40 ml of that solution were added to set of seven 50 ml centrifuge tubes.
4. For each set of seven centrifuge tubes containing the pH adjusted sodium nitrate solution, granular carbon was added achieve carbon mass concentrations of 0.1, 1.0, 5.0. 10.0, 15.0, and 20.0 wt %. The seventh tube was contained no carbon and was included in the analysis as a blank.
5. Once the carbon is added to solution, the carbon suspensions are gently shaken for 24 hours in at 25° C. in a temperature-controlled water bath.
6. After 24 hours, the solutions are removed from the water bath and the carbon is allowed to settle for roughly one hour.
7. Next the pH of each carbon suspension is measured using a pH probe. The "blank" solutions are checked to ensure consistent pH over the 24-hour period.
8. For a set of samples using either the pH 3, 6, or 11 solutions, pH is plotted as function of carbon mass. The $pH_{PZC}$ value for the carbon is then defined as point at which the measured pH has stabilized for each of the three sample sets. It is expected that this stable pH is will generally be the same, independent of the initial pH of the sodium nitrate the carbon was suspended in.

Thermogravimetric Analysis (TGA)

Carbon samples were placed in a TGA apparatus (TA Instruments Model TGA 500) and heated inertly under a flow of nitrogen while the samples were heated from about 25° C. to 900° C. Mass loss from the sample is measured as it is heated using a sensitive balance in the apparatus. Samples containing moisture are likely to lose mass at temperature up to about 100° C., and other surface oxides may be driven from the sample as either CO or $CO_2$ at temperatures ranging from about 200 to 900° C. Therefore, a person of skill can compare the amount of surface oxygen species or moisture in a sample by examining the relative degree of mass loss between two carbons, such as a feedstock activated carbon which may have naturally oxidized vs. a calcined version of that feedstock. The carbon that has been subjected to the high-temperature calcination process is likely to have lost moisture and surface oxygen moieties through that process and therefore would lose less mass in the TGA vs a non-calcined feedstock of the same material.

Elemental Oxygen Analysis

The "bulk" oxygen content of an activated carbon sample can be measured using an elemental analyzer. Bulk oxygen is defined in this context as any oxygen that may be present throughout the entirety of the sample vs. only oxygen that might be only measured in the first few nanometers of a carbon surface as determined by complimentary technique such as x-ray spectroscopy (XPS). The bulk oxygen content of various dry carbon samples was determined using an Elementar vario El cube, which heats the sample to high temperature and uses an infrared detector to determine oxygen concentration. Using this device, a person of skill can compare the oxygen content differences between calcined and non-calcined activated carbons.

Determination of the Moisture Content of Activated Carbon

To determine the moisture content of activated carbon samples, Calgon Carbon Corporation Test Method No. TM-1 ("TM-1") was performed. This TM-1 test is identical to ASTM D2867.

Determination of the Iodine Number of Activated Carbon

To determine the ash content of activated carbon samples, Calgon Carbon Corporation Test Method No. TM-4 ("TM-4") was performed. This TM-4 test is identical to ASTM D4607.

Determination of the Ash Content of Activated Carbon

To determine the ash content of activated carbon samples, Calgon Carbon Corporation Test Method No. TM-5 ("TM-5") was performed. This TM-5 test is identical to ASTM D2866.

Determination of the Apparent Density of Activated Carbon

To determine the ash content of activated carbon samples, Calgon Carbon Corporation Test Method No. TM-7 ("TM-7") was performed. This TM-5 test is identical to ASTM D2854.

Example 1—Compatibility of Various Activated Carbons

Various activated carbons derived from various sources and prepared by various methods were screened for use as a sorbent for purifying coolant as shown in TABLE 3 below. BGX is a wood-based granular activated carbon that has a $N_2$ BET or specific surface of adsorption of about 1550-1650 $m^2/g$, an ash content of 2.5 wt. %, and a density in place of about 0.24 $g/cm^3$, and is available from Calgon Carbon Corporation of Moon Township, Pennsylvania. RB is a coal-based powdered activated carbon having an iodine number of at least 1070 mg/g, an ash content not exceeding 23 wt. %, moisture content not exceeding 2 wt. %, and a wet screen mesh size of minus 325 US mesh of about 60-75 wt. %, and is available from Calgon Carbon Corporation of Moon Township, Pennsylvania.

TABLE 3

| Carbon | Size (mesh) | Acid Washed? | Drying Procedure |
|---|---|---|---|
| Coconut-Derived CP11 | 12 × 20 | Y | None |
| Coconut-Derived CP13 | 12 × 20 | Y | None |

TABLE 3-continued

| Carbon | Size (mesh) | Acid Washed? | Drying Procedure |
|---|---|---|---|
| Kuraray GC Carbon | | Y | None |
| Kuraray GC Carbon | | Y | $N_2$/Furnace |
| Kuraray GC Carbon | | Y | Vacuum |
| Kuraray GC Carbon | | Y | Air/Solvent Oven |
| Kuraray GC Carbon 5% H2 | | Y | None |
| Kuraray GC Carbon 5% H2 | | Y | $N_2$/Furnace |
| Kuraray GC Carbon 5% H2 | | Y | Vacuum |
| Kuraray GC Carbon 5% H2 | | Y | Air/Solvent Oven |
| Kuraray "Cebu" Carbon | | N | None |
| Kuraray "Cebu" Carbon | | N | $N_2$/Furnace |
| Kuraray "Cebu" Carbon | | N | Vacuum |
| Kuraray "Cebu" Carbon | | N | Air/Solvent Oven |
| BGX (vacuum packed) | 12 × 40 | Y | Inert Atmosphere Calcination/Kiln |
| BGX ($N_2$ packed) | 12 × 40 | Y | Inert Atmosphere Calcination/Kiln |
| RB | 12 × 40 | N | None |
| RB (vacuum packed) | 12 × 40 | N | Inert Atmosphere Calcination/Kiln |
| RB ($N_2$ packed) | 12 × 40 | N | Inert Atmosphere Calcination/Kiln |

Specific Drying Procedures are as Follows:

None:
Filter media was taken from the container as supplied and tested.

Vacuum:
Approximately 100 grams of filter media material was added to a 4-ounce glass jar. Next, the jar opening was covered with three KIMWIPES® (cellulosic wipes for delicate tasks) held in place with two rubber binders. Covered jars were placed in a vacuum oven. Vacuum was applied, and samples were heated to 180° C. Drying was conducted for 24 hours or until the pressure in the vacuum oven was less than 100 mTorr (13.33 Pa), indicating the drying was complete. The oven was allowed to cool to room temperature under vacuum. When at room temperature, the chamber was vented with dry nitrogen to atmospheric pressure, the KIMWIPES® removed, the jars capped, and the lids were wrapped with vinyl tape. The samples were then placed in a dry $N_2$ box for storage.

$N_2$/Furnace:
Approximately 50 grams of filter media material was added to a 4-ounce glass jar. Filled jars, without caps, were placed in a muffle furnace and the door was closed. Nitrogen flow was set to 90 SCFH and the furnace was purged for 10 minutes. The nitrogen flow was then reduced to 20 SCFH, and the furnace was heated to 180° C. Drying was conducted at 180° C. for 16 hours. The jars were taken out of the oven at 180° C. and capped and then allowed to return to room temperature. The samples were then placed in a dry $N_2$ box for storage.

Air/Solvent Oven:
Air drying in a vented solvent oven. Approximately 50 grams of filter media material was added to a 4-ounce glass jar. The jars, without caps, were placed in a vented solvent oven and the oven was heated to 180° C. Drying was conducted for 16 hours. The jars were taken out of the oven at 180° C. and capped and then allowed to return to room temperature. The samples were then placed in a dry N2 box for storage.

Inert Atmosphere Calcination/Kiln:

Kiln calcination in an inert atmosphere. Approximately 0.5 kg of activated carbon was added to a rotary kiln. The activated carbon was processed at 950° C. for 20 minutes under an inert nitrogen atmosphere. The calcined activated carbon was then discharged into a nitrogen containing box and cooled inertly to about 100° C. The activated carbon was then packed inertly in a nitrogen purged container or vacuum packed in a manner to minimize exposure to air.

Example 2—Moisture Content

Various activated carbons derived from various sources and having various moisture content were screened for compatibility with use as a sorbent as described in TABLE 4.

TABLE 4

| Sample No. | Carbon | Calcined? | Packing | Apparent Density (g/cm$^3$) | Moisture (%) |
|---|---|---|---|---|---|
| 1 | BGX | Y | Inert Vacuum | 0.298 | 0.65 |
| 2 | BGX | Y | Nitrogen Packed | 0.306 | 1.3 |
| 3 | RB | Y | Inert Vacuum | 0.370 | 0.85 |
| 4 | RB | Y | Nitrogen (no packing) | 0.368 | 1.0 |

TABLE 4-continued

| Sample No. | Carbon | Calcined? | Packing | Apparent Density (g/cm$^3$) | Moisture (%) |
|---|---|---|---|---|---|
| 5 | RB | N | Air (with lid on container) | 0.372 | 2.5 |

Example 3

Larger calcination experiments were performed using a rotary kiln in which the coal-based "RB" activated carbon was calcined at temperature of about 980° C. for up to 30 minutes under a flow of nitrogen. Once calcined, the carbon was allowed to cool in under a blanket of nitrogen and then packaged inertly. Table 5 below compares some of the characteristics of the calcined RB versus its feedstock (denoted by F/S) that was either dried (typically for 3 hours at 150° C.) in the laboratory or left unprocessed. The calcined RB is noted as "calcined RB", the dried RB feedstock is denoted as "F/S RB Dried", and the unprocessed feedstock RB is denoted as "F/S RB".

In Table 5 the calcination of the carbon achieves low moisture of 0.2 wt. %, a level that cannot be achieved by drying alone. The advantage of the calcination process is also seen when observing the bulk oxygen levels, which were 1.6% for the calcined RB. This is a reduction of about a factor of 2 as compared to the F/S RB and 1.5 as compared to the F/S RB dried. Additionally, once notices an increase in the contact pH to 10.4 for the calcined RB vs. the other RB samples, which indicates an increase in carbon alkalinity resulting from the calcination process through the removal of surface oxygen groups or other acidic moieties present in the carbon. While not wishing to be bound by theory, it is believed that low moisture, oxygen content, and surface acidity are key characteristics of the activated carbon for the immersive cooling application, Table 5 shows that the high-temperature calcination process produces an activated carbon product with these intrinsic traits, without significantly altering the transport structure of the feedstock carbon as indicated by the relatively small changes in iodine and molasses number.

TABLE 5

| Sample Name | Density (g/cm$^3$) | Ash Content (wt. %) | Iodine Number (mg/g) | Molasses Number | Moisture Level (wt. %) | Contact pH | Bulk Oxygen Content wt. % |
|---|---|---|---|---|---|---|---|
| Calcined RB | 0.402 | 11.6 | 1278 | 523 | 0.2 | 10.4 | 1.6 |
| F/S RB Dried | 0.393 | 11.7 | 1311 | 538 | 0.7 | 9.9 | 2.5 |
| F/S RB | 0.404 | 12.1 | 1301 | 584 | 2.0 | 9.6 | 2.8 |

Calcination of a granular, wood-based activated carbon was performed in the laboratory in which the feedstock, F/S BGX, was calcined at a temperature of about 950° C. for 30 minutes under a flow of nitrogen. Once calcined, the activated carbon was allowed to cool under a blanket of nitrogen to ambient temperature. It was then stored in an inert environment. This calcined version of F/S BGX is referred to as Calcined BGX. Data was also collected for an air-dried version of F/S BGX and is noted as F/S BGX Dried, where appropriate. This version of the activated carbon was made by drying F/S BGX for 3 hours at 150° C. in air. Physical and chemical characteristics of these wood-based materials are described in Table 6.

TABLE 6

| Sample Name | Density (g/cm$^3$) | Ash Content (wt. %) | Iodine Number (mg/g) | Molasses Number | Moisture Level (wt. %) | Contact pH | Bulk Oxygen Content wt. % |
|---|---|---|---|---|---|---|---|
| Calcined BGX | 0.306 | 3.0 | 1011 | 1519 | 0.09 | 7.3 | 5.5 |
| F/S BGX Dried | 0.239 | 2.6 | 1024 | 2552 | 0.41 | 4.0 | 10.8 |
| F/S BGX | 0.259 | 2.4 | 987 | 2502 | 7.12 | — | 12.5 |

In Table 6, the Calcined BGX sample achieved a very low moisture level of less than 0.1 wt. %. Further advantages are achieved through calcination as the Calcined BGX sample bulk oxygen concentration was about 50% less than the F/S BGX Dried sample, and about 65% less than the F/S BGX sample. Additionally, the contact pH of the Calcined BGX was nearly neutral at a value of 7.3 vs. the acidic pH value of 4.0 measured for the F/S BGX Dried sample. The increased contact pH of the Calcined BGX sample indicates a significant reduction in its surface acidity due to the presence of less surface oxygen groups and likely other acidic moieties. The data in Table 6 also shows that the calcination process maintains a high degree of the F/S BGX's inherent pore structure since the Calcined BGX material has a molasses number of more than 1500. This large molasses number is indicative of a well-developed transport pore structure. Additionally, the Calcined BGX sample also has an iodine number of more than 1000, which is characteristic of an activated carbon with significant overall surface activity. The pore structure and surface activity exhibited by the Calcined BGX, in combination with its very low moisture, lower oxygen content, and reduced surface acidity, are believed to be key advantages when using a wood-based activated carbon for the immersive cooling application.

For the samples listed in Table 5, TGA analysis was performed. Table 7 describes the mass loss data for calcined RB, F/S RB Dried, and F/S RB. after processing in the TGA. In Table 7, the total mass loss of the calcined RB sample was only 1.50 wt. % versus values of 1.91 and 2.38 wt. % for the F/S RB Dried and F/S RB samples, respectively. Since the calcined RB sample exhibited the smallest total mass percentage change after processing in the TGA, this shows that calcination had produced a more inert activated carbon, with less moisture and fewer surface functional groups that could be evolved from the activated carbon during the TGA experiment. Conversely, the F/S RB Dried and F/S RB materials contained more inherent moisture and surface functional groups than the calcined RB, and therefore lost more mass during their respective TGA experiments.

TABLE 7

TGA Mass Loss (wt. %) for Calcined and Non-Calcined RB samples

| Sample | 25-200° C. | 200-600° C. | 600-900° C. | Total |
| --- | --- | --- | --- | --- |
| Calcined RB | 0.67 | 0.23 | 0.60 | 1.50 |
| F/S RB Dried | 0.68 | 0.37 | 0.86 | 1.91 |
| F/S RB | 0.99 | 0.37 | 1.02 | 2.38 |

Table 8 describes the mass loss (wt. %) of calcined BGX, F/S BGX Dried, and F/S BGX after processing in the TGA. The total mass loss of the calcined BGX sample was only 9.35 wt. % vs. values of 12.60 and 35.50 wt. % for the F/S BGX Dried and F/S BGX samples, respectively. The calcination process produces a more pristine activated carbon surface than drying alone and therefore the calcined RB exhibited less total mass loss after processing in the TGA since it inherently had lower levels of moisture and surface moieties that could evolve during the analysis. For this wood-based activated carbon, it appears that calcination is particularly effective at removing entrained moisture (25-200° C. range) and surface oxides or other surface functional groups in the 200-600° C. range. While differences in mass loss are less pronounced between F/S BGX Dried and calcined BGX in the 600-900° C. range, the smaller mass loss exhibited by the calcined BGX still shows the importance of calcination at high temperature to remove additional surface oxygen or other functional groups. Therefore, the calcination of the activated carbon feedstock, F/S BGX, produces an enhanced wood-based product, calcined BGX, with properties that are uniquely suited for immersive cooling applications.

TABLE 8

TGA Mass Loss (wt. %) for Calcined and Non-Calcined BGX samples

| Sample | 25-200° C. | 200-600° C. | 600-900° C. | Total |
| --- | --- | --- | --- | --- |
| Calcined BGX | 1.37 | 0.69 | 7.29 | 9.35 |
| F/S BGX Dried | 1.16 | 3.63 | 7.81 | 12.60 |
| F/S BGX | 6.47 | 6.38 | 22.66 | 35.50 |

Table 9 describes the contact pH and the amount of 0.1 N hydrochloric acid (HCl) required to neutralize carbon suspensions of either calcined RB, F/S RB Dried, or F/S RB as described in TM-62. Here it takes nearly 10 mL more of the 0.1 N HCl to reach the pH 7 end point when titrating the calcined RB suspension vs. the F/S RB Dried, which indicates a more basic activated carbon. The titration data in concert with the higher contact pH of the calcined RB reinforce its increased alkaline nature due to elimination of acidic moieties from the carbon surface resulting from the calcination process.

TABLE 9

| Sample | Initial pH (Contact pH) | Final Titrated pH | 0.1N HCl Titration volume (mL) |
| --- | --- | --- | --- |
| Calcined RB | 9.8 | 7.0 | 50.7 |
| F/S RB Dried | 9.0 | 7.0 | 41.0 |

Table 10 describes the pH and amount of 0.1 N NaOH required to neutralize carbon suspensions of calcined BGX and F/S BGX Dried as described in TM-62. In Table 9, the contact pH of the calcined BGX was 6.7 and required only 0.9 mL of 0.1 N NaOH to reach the pH 7 endpoint, whereas the F/S BGX Dried sample had a significantly more acidic contact pH of 4.0 and required 48.5 mL base to reach its titration endpoint. This shows that calcination process results in activated carbon products with decreased acidity, even when the activated carbon feedstock is inherently acidic (as in the case of BGX) due to the method of its manufacture.

TABLE 10

| Sample | Initial pH (Contact pH) | Final Titrated pH | 0.1N NaOH Titration volume (mL) |
| --- | --- | --- | --- |
| Calcined BGX | 6.7 | 7.0 | 0.9 |
| F/S BGX Dried | 4.0 | 7.0 | 48.5 |

Table 11 describes the titration of the filtrate obtained from aqueous suspensions of F/S RB Dried and calcined RB. Here, 40 mL of filtrate were titrated using 0.004 N HCl acid. The initial pH of the calcined RB filtrate was 10.5 and required 12.5 mL of acid to reach the pH endpoint value of 7, compared to only 2.8 mL required when titrating the F/S RB Dried filtrate, as its filtrate had a less alkaline initial value of 9.8. This titration data and the difference in the initial filtrate pH of the two materials reflects the enhanced alkaline nature of the calcined activated carbon relative to the dried activated carbon.

TABLE 11

| Sample | Filtrate Volume Analyzed (mL) | Filtrate pH after 24 hours of shaking | Filtrate pH after titration | Titrant Volume 0.004N HCl (mL) |
|---|---|---|---|---|
| Calcined RB | 40 | 10.5 | 7.0 | 12.5 |
| F/S RB Dried | 40 | 9.8 | 7.0 | 2.8 |

Table 12 describes the titration of filtrate obtained from aqueous suspensions of F/S BGX Dried and calcined BGX. The initial pH of filtrate obtained from the calcined BGX suspension was slightly alkaline at 7.8 and required 16.8 mL of 0.004 N HCl to reach an end point pH of 7. Conversely, the initial pH of filtrate obtained from the F/S BGX Dried suspension was significantly more acidic at a value of 4.7. This filtrate required 68 mL of 0.004 N NaOH to reach the titration endpoint pH. The data in Table 11 shows that even for activated carbons like BGX that are inherently acidic (due to their method of manufacture), calcination results in a significant shift of the activated carbon surface towards a neutral or alkaline state that is beneficial for this application.

TABLE 12

| Sample | Filtrate Volume Analyzed (mL) | Filtrate pH after 24 hours of shaking | Filtrate pH after titration | Titrant Volume 0.004N HCl or 0.004N NaOH (mL) |
|---|---|---|---|---|
| Calcined BGX | 34 | 7.8 | 7.0 | 16.8 mL of 0.004N HCl |
| F/S BGX Dried | 34 | 4.7 | 7.0 | 67.0 mL of 0.004 NaOH |

Thermal processes such as calcination affect the surface functionality of an activated carbon which in turn influences its $pH_{PZC}$. For the RB and BGX activated carbons, larger $pH_{PZC}$ values are measured after calcination, indicating an increase in the basic (alkaline) characteristics of the activated carbon surface. The calcination process removes acidic oxygen containing surface groups.

FIG. 5 shows average pH measurements at common activated carbon concentrations of 5 wt. %, 10 wt. %, 15 wt. %, and 20 wt. % for the F/S RB Dried or Calcined RB-sodium nitrate suspensions. As the wt. % of the F/S RB Dried activated carbon increased to 15 and 20 wt. %, an asymptotic $pH_{PZC}$ value of about 11.5 was observed. Alternatively, as the amount of Calcined RB increased to 20 wt. %, the average suspension pH was still increasing. This means the $pH_{PZC}$ of the Calcined RB is at least 11.8, but likely higher. The data in FIG. 5 shows that calcination of the F/S RB activated carbon imparts enhanced surface alkalinity, thereby improving its functionality in the immersive cooling application.

FIG. 6 shows average pH measurements at common activated carbon concentrations of 5 wt. %, 10 wt. %, 15 wt. %, and 20 wt. % for the F/S BGX Dried or Calcined BGX-sodium nitrate suspensions. As the wt. % of the F/S BGX Dried activated carbon increased to 20 wt. %, an asymptotic, acidic $pH_{PZC}$ value of about 4.5 was observed. Alternatively, as the amount of Calcined BGX reached 20 wt. %, the average recorded pH was decreasing, but steadying towards a near-neutral $pH_{PZC}$ value of about 6.5. The data in FIG. 6 shows that calcination of the F/S BGX activated carbon significantly decreases its surface acidity thereby improving its functionality in the immersive cooling application.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

What is claimed is:

1. A method of purifying a coolant that contains one or more conductive contaminants, the method comprising:
   contacting the coolant with a sorbent to thereby cause the sorbent to adsorb the one or more conductive contaminants, wherein the sorbent includes a sorbent material that has a bulk oxygen content of about 1 wt. % to about 5 wt. %, a moisture level of at most about 1.5 wt. %, and a molasses number of at least about 150,
   wherein the sorbent material includes activated carbon.

2. The method of claim 1, wherein the activated carbon is formed from one or more of bituminous coal, sub-bituminous coal, lignite coal, anthracite coal, wood, peat, nut shells, pits, coconut, babassu nut, macadamia nut, dende nut, peach pit, cherry pit, olive pit, walnut shell, wood, bagasse, rice hulls, corn husks, wheat hulls, polymers, resins, petroleum pitches, and other carbonaceous material.

3. The method of claim 1, wherein the sorbent material is formed from calcination of a carbonaceous material under an inert atmosphere at a temperature of at least about 500° C.

4. The method of claim 1, wherein the sorbent material has a gravimetric iodine number of at least about 850 mg/g.

5. The method of claim 4, wherein the sorbent material has a gravimetric iodine number of at least about 1100 mg/g.

6. The method of claim 1, wherein the sorbent has been treated to prevent reintroduction of oxygen.

7. The method of claim 6, wherein treating the sorbent to prevent the reintroduction of oxygen includes one or more of purging the sorbent material with an inert atmosphere, placing the sorbent within an enclosure with an oxygen scavenging compound, and mechanically removing oxygen from an enclosure that contains the sorbent.

8. The method of claim 1, wherein the coolant comprises one or more of an oil, a hydrocarbon, a ketone, an ether, or any fluorinated derivative thereof.

9. The method of claim 1, wherein the coolant has a boiling point of about 34° C. to about 175° C. and a dielectric constant of less than about 10 at 1 kHz.

10. The method of claim 1, wherein the coolant has a kinematic viscosity of not more than about 0.8 cSt.

11. The method of claim 1, further comprising contacting an electronic component with the coolant and diffusing conductive contaminants from the electronic component to the coolant.

12. The method of claim 1, further comprising filtering the coolant through a size exclusion filter.

13. A system for purifying a coolant that contains one or more conductive contaminants, the system comprising:
an enclosure containing a sorbent that includes a sorbent material that has a bulk oxygen content of about 1 wt. % to about 5 wt. %, a moisture level of at most about 1.5 wt. %, and a molasses number of at least about 150,
at least one inlet, or at least one outlet, or at least one inlet and at least one outlet that is in communication with the sorbent, and
a tank containing the coolant such that at least a portion of the coolant contacts the sorbent.

14. The system of claim 13, wherein the sorbent includes sorbent material that is activated carbon.

15. The system of claim 14, wherein the activated carbon is formed from one or more of bituminous coal, sub-bituminous coal, lignite coal, anthracite coal, wood, peat, nut shells, pits, coconut, babassu nut, macadamia nut, dende nut, peach pit, cherry pit, olive pit, walnut shell, wood, bagasse, rice hulls, corn husks, wheat hulls, polymers, resins, petroleum pitches, and other carbonaceous material.

16. The system of claim 13, wherein the sorbent material is formed from calcination of a carbonaceous material under an inert atmosphere at a temperature of at least about 500° C.

17. The system of claim 13, wherein the sorbent material has a gravimetric iodine number of at least about 850 mg/g.

18. The system of claim 17, wherein the sorbent material has a gravimetric iodine number of at least about 1100 mg/g.

19. The system of claim 13, wherein the sorbent has been purged with nitrogen to prevent reintroduction of oxygen.

20. The system of claim 13, wherein the sorbent is inertly-packed or vacuum packed in the enclosure.

21. The system of claim 13, further comprising a pump that conveys the coolant through the sorbent.

22. The system of claim 13, wherein the coolant comprises one or more of an oil, a hydrocarbon, a ketone, an ether, or any fluorinated derivative thereof.

23. The system of claim 13, wherein the coolant has a boiling point of about 34° C. to about 175° C., a freezing point of about −38° C. to about −138° C., and a dielectric constant of less than about 10 at 1 kHz.

24. The system of claim 13, wherein the coolant has a kinematic viscosity of not more than about 0.8 cSt.

25. The system of claim 13, further comprising an electronic component that contains one or more conductive contaminants.

26. The system of claim 25, wherein the electronic component is housed within a data center.

27. The system of claim 13, further comprising a size-exclusion filter connected downstream of the enclosure comprising the sorbent.

28. A composition for purifying a coolant that contains one or more conductive contaminants, the composition comprising:
a sorbent that includes a sorbent material that has a bulk oxygen content of about 1 wt. % to about 5 wt. %, a moisture level of at most about 1.5 wt. %, and a molasses number of at least about 150, wherein the sorbent material includes activated carbon.

29. The composition of claim 28, wherein the activated carbon is formed from one or more of bituminous coal, sub-bituminous coal, lignite coal, anthracite coal, wood, peat, nut shells, pits, coconut, babassu nut, macadamia nut, dende nut, peach pit, cherry pit, olive pit, walnut shell, wood, bagasse, rice hulls, corn husks, wheat hulls, polymers, resins, petroleum pitches, and other carbonaceous material.

30. The composition of claim 28, wherein the sorbent material has a contact pH of about 6.5 to about 12.

31. The composition of claim 28, wherein the sorbent material has a gravimetric iodine number of at least about 850 mg/g.

32. The composition of claim 31, wherein the sorbent material has a gravimetric iodine number of at least about 1100 mg/g.

33. The composition of claim 28, wherein the sorbent has been treated to prevent reintroduction of oxygen.

34. A method for making a sorbent for purifying a coolant that contains one or more conductive contaminants, said sorbent containing a sorbent material, the method comprising:
calcining a precursor sorbent material to thereby form a sorbent material that has a bulk oxygen content of about 1 wt. % to about 5 wt. %, a moisture level of at most about 1.5 wt. %, and a molasses number of at least about 150,
wherein the sorbent material includes activated carbon.

35. The method of claim 34, where the activated carbon is formed from one or more of bituminous coal, sub-bituminous coal, lignite coal, anthracite coal, wood, peat, nut shells, pits, coconut, babassu nut, macadamia nut, dende nut, peach pit, cherry pit, olive pit, walnut shell, wood, bagasse, rice hulls, corn husks, wheat hulls, polymers, resins, petroleum pitches, and other carbonaceous material.

36. The method of claim 34, wherein calcination occurs at a temperature of at least about 500° C.

37. The method of claim 34, further comprising treating the sorbent material to prevent reintroduction of oxygen and moisture.

38. The method of claim 37, wherein treating the sorbent to prevent reintroduction of oxygen includes one or more of purging the sorbent material with an inert atmosphere, placing the sorbent within an enclosure with an oxygen scavenging compound, and mechanically removing oxygen from an enclosure that contains the sorbent.

* * * * *